US012664580B2

(12) United States Patent  (10) Patent No.: US 12,664,580 B2
Hall  (45) Date of Patent: Jun. 23, 2026

(54) SYSTEM AND METHOD FOR LEVERAGING INTEGRATION PROCESS CODE INSTRUCTION CONNECTIVITY AMONG USERS TO FACILITATE TRADING PARTNER DATA INTEGRATION CONNECTIVITY

(71) Applicant: BOOMI, LP, Chesterbrook, PA (US)

(72) Inventor: Clark B. Hall, Lexington, KY (US)

(73) Assignee: BOOMI, LP, Chesterbrook, PA (US)

( * ) Notice: Subject to any disclaimer, the term of this patent is extended or adjusted under 35 U.S.C. 154(b) by 427 days.

(21) Appl. No.: 18/127,238

(22) Filed: Mar. 28, 2023

(65) Prior Publication Data

US 2024/0331014 A1      Oct. 3, 2024

(51) Int. Cl.
G06Q 30/0601      (2023.01)

(52) U.S. Cl.
CPC ..... G06Q 30/0635 (2013.01); G06Q 30/0641 (2013.01)

(58) Field of Classification Search
CPC ...................... G06Q 30/0635; G06Q 30/0641
See application file for complete search history.

(56) References Cited

U.S. PATENT DOCUMENTS 9,953,378 B2 * 4/2018 Purves ................ G06F 9/44526
2018/0167490 A1 * 6/2018 Morton ................... G06F 3/167

2019/0266275 A1 * 8/2019 Wernze ................. G06F 16/248
2021/0097069 A1 * 4/2021 Schwartz ................ G06F 16/25
2022/0036437 A1 * 2/2022 Morton .............. G06Q 30/0641

OTHER PUBLICATIONS

Improving reliability of data distribution across categories of business and industries with chain data lineage M Matsubara, T Miyamae, A Ito, K Kamakura—Fujitsu Sci Tech J, 2020—fujitsu.com (Year: 2020).*

* cited by examiner

*Primary Examiner* — Michael Misiaszek
(74) *Attorney, Agent, or Firm* — Prol Intellectual Property Law, PLLC; H. Kenneth Prol

(57)      ABSTRACT

An information handling system operating an integration connectivity sales facilitation system may comprise a display device displaying a request from a purchasing user to facilitate purchase of a product for sale by the selling user, a processor to automatically generate code instructions of a future data integration process for transferring a first dataset field value identified by a first dataset field name at a purchasing user to a second dataset field value identified by a second dataset field name at the selling user, based on a merged data lineage map for previously generated code instructions for transferring such first and second dataset field values to a common trading partner storage location identified by a common trading partner dataset field name, and a network interface device transmitting the code instructions for future execution and a runtime engine for execution at a remote location in deployment of the future data integration process.

20 Claims, 9 Drawing Sheets

| Customer Name | Score Card | Product Description | Pack | Unit Price | |
|---|---|---|---|---|---|
| Toys Corp. | ☆9.5/10 | Purple Furby | 1 | 9 | ⊘ APPROVED |
| Amazon.® | ☆8/10 | Ergonomic Wooden Gloves | 532 | 47 | (APPROVE) |
| 621 | 622 | 623 | 624 | 625 | 626 |

627

FIG. 7

START

702 — Plurality of users having one or more common trading partners identify product sales datasets describing products to offer for sale via sales connectivity GUI, by purchase order dataset field name given in each enterprise user's formatting 704 — Purchasing user searches for other users offering specific product for sale via sales connectivity GUI 706 — Integration connectivity sales facilitation system queries databases or APIs of plurality of users to identify selling user offering specific product for sale and unit price 708 — Sales connectivity GUI displays identification of selling user, description of specific product for sale, and offered unit price to purchasing user 710 — Purchasing user requests connectivity to selling user via sales connectivity GUI to facilitate exchange of purchase order data sets for specific product offered for sale between purchasing user and selling user 712 — Selling user accepts connectivity request?

NO → 714 — Sales connectivity GUI notifies integration connectivity sales facilitation system that selling user has accepted request to connect with purchasing user for execution of purchase order data integration process for transmission of purchase order datasets from purchasing user storage location to selling user storage location, as required for the purchasing user to purchase product from selling user YES → 716 — Integration application management system used to establish end-to-end business integration with graphic icons to generate integration code instructions 718 — Sales connectivity GUI notifies purchasing user that selling user has not accepted request to connect with purchasing user

END

*FIG. 8*

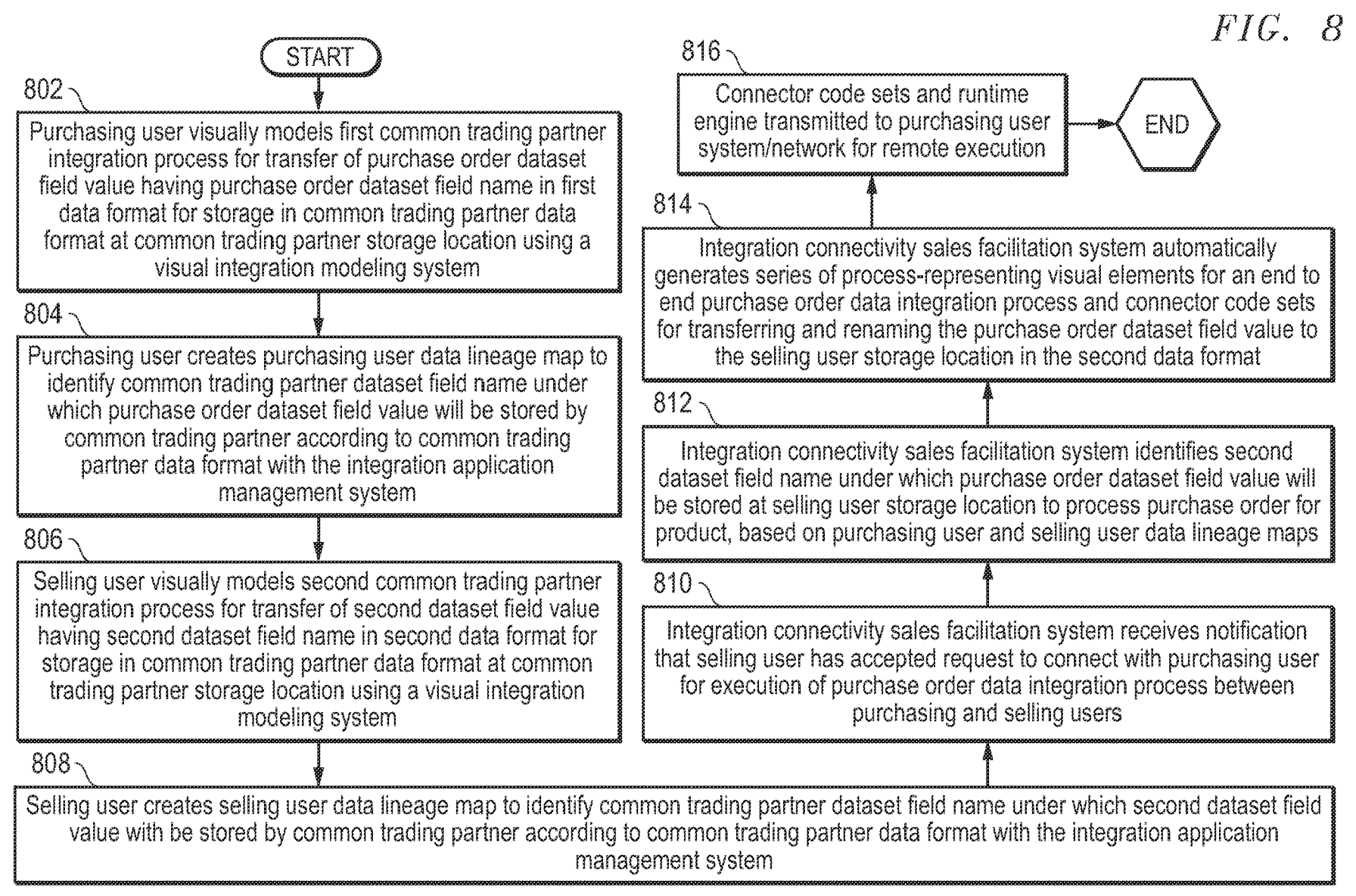

START

802 — Purchasing user visually models first common trading partner integration process for transfer of purchase order dataset field value having purchase order dataset field name in first data format for storage in common trading partner data format at common trading partner storage location using a visual integration modeling system 804 — Purchasing user creates purchasing user data lineage map to identify common trading partner dataset field name under which purchase order dataset field value will be stored by common trading partner according to common trading partner data format with the integration application management system 806 — Selling user visually models second common trading partner integration process for transfer of second dataset field value having second dataset field name in second data format for storage in common trading partner data format at common trading partner storage location using a visual integration modeling system 808 — Selling user creates selling user data lineage map to identify common trading partner dataset field name under which second dataset field value with be stored by common trading partner according to common trading partner data format with the integration application management system 810 — Integration connectivity sales facilitation system receives notification that selling user has accepted request to connect with purchasing user for execution of purchase order data integration process between purchasing and selling users 812 — Integration connectivity sales facilitation system identifies second dataset field name under which purchase order dataset field value will be stored at selling user storage location to process purchase order for product, based on purchasing user and selling user data lineage maps 814 — Integration connectivity sales facilitation system automatically generates series of process-representing visual elements for an end to end purchase order data integration process and connector code sets for transferring and renaming the purchase order dataset field value to the selling user storage location in the second data format 816 — Connector code sets and runtime engine transmitted to purchasing user system/network for remote execution

END

SYSTEM AND METHOD FOR LEVERAGING INTEGRATION PROCESS CODE INSTRUCTION CONNECTIVITY AMONG USERS TO FACILITATE TRADING PARTNER DATA INTEGRATION CONNECTIVITY

FIELD OF THE DISCLOSURE

The present disclosure relates generally to a system and method for connecting to and executing customized data integration processes. More specifically, the present disclosure relates to leveraging connectivity information among existing enterprise users and trading partners established via previously executed data integration process code instructions modeled with a visual integration modeling system for a common trading partner to facilitate sales among the existing enterprise users.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 6B is a graphical diagram illustrating a sales connectivity GUI for accepting a request for connectivity using the integration connectivity sales facilitation system according to an embodiment of the present disclosure;

FIG. 7 is a flow diagram illustrating a method of facilitating integration connectivity between a purchasing user and a selling user who have a common trading partner via a visual integration modeling system according to an embodiment of the present disclosure; and FIG. 8 is a flow diagram illustrating a method of automatically generating connector code sets for use with a visual integration modeling system to exchange purchase order dataset field values according to an embodiment of the present disclosure.

The use of the same reference symbols in different drawings may indicate similar or identical items.

DETAILED DESCRIPTION

Figure 1:
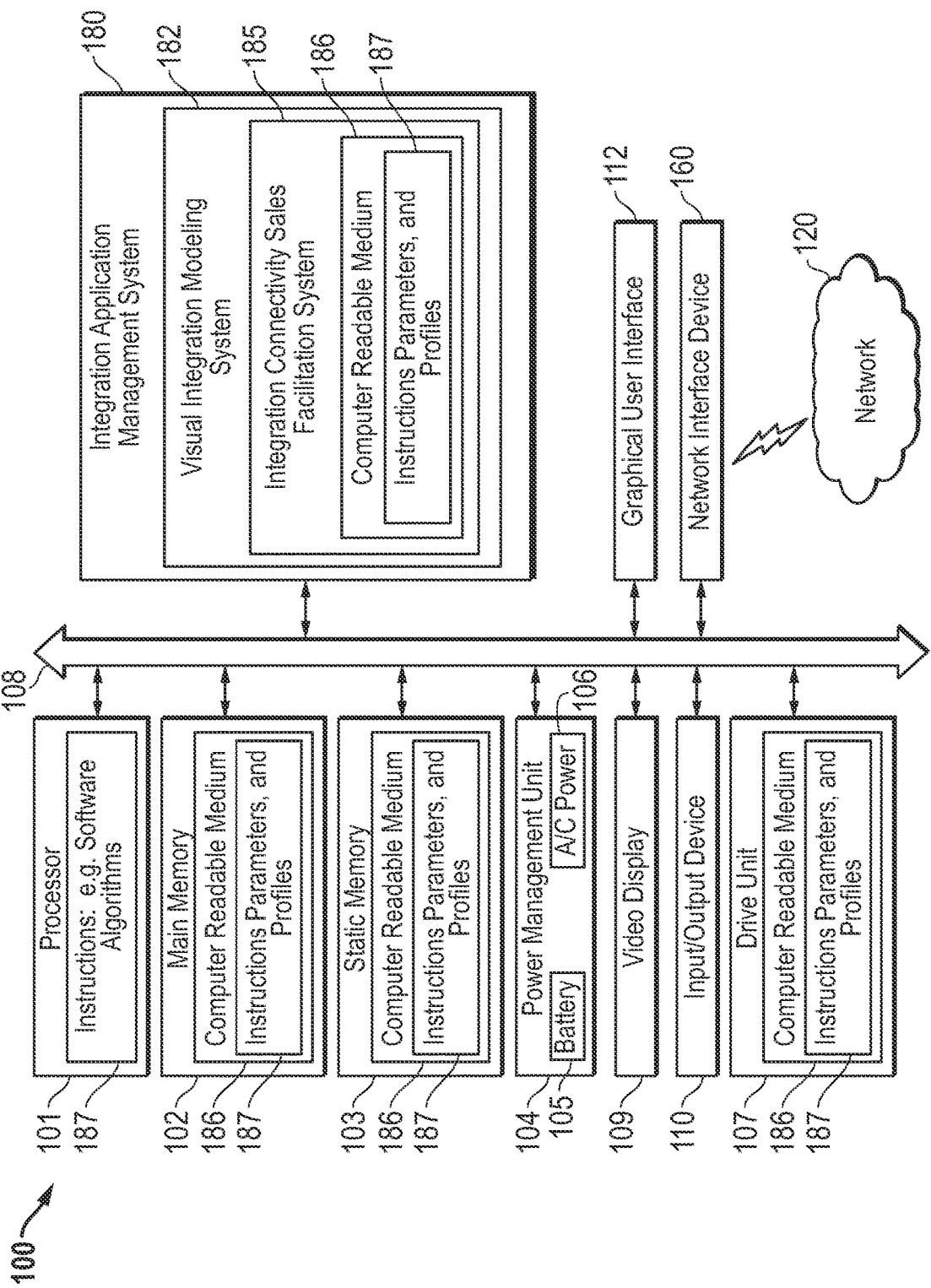
FIG. 1 is a block diagram illustrating an information handling system with a visual integration modeling system and integration connectivity sales facilitation system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments. Custom coding may be required to provide integration among disparate databases which may be costly and time consuming.

Today, most corporations or other enterprises have sophisticated computing systems that are used both for internal operations, and for communicating outside the enterprise's network. Much of present day information exchange is conducted electronically, via communications networks, both internally to the enterprise, and among enterprises having disparate database systems and access policies. Accordingly, it is often desirable or necessary to exchange information/data between distinctly different computing systems, computer networks, software applications, etc. The enabling of communications between diverse systems/networks/applications in connection with the conducting of business processes is often referred to as "business process data integration." In the business process data integration context, there is a significant need to communicate between different software applications/systems within a single computing network, e.g., between an enterprise's information warehouse management system and the same enterprise's purchase order processing system. There is also a significant need to communicate between different software applications/systems within different computing networks (e.g., between a buyer's purchase order processing system, and a seller's invoicing system), sometimes referred to as a business to business (B2B) process. Some of these different software applications/systems may be cloud-based, with physical servers located in several different countries, cities, or other geographical locations around the world. As data is integrated between and among these cloud-based platforms, datasets may be stored (e.g., temporarily or indefinitely) in some form at physical servers in these various storage locations according to the required formatting for that storage location.

Relatively recently, systems have been established to enable exchange of data via the Internet, e.g., via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as Electronic Data Interchange (EDI) Software, or Business-to-Business (B2B) Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. In contrast to the present disclosure, these applications are purchased, installed and operated on the user's local system and require expense and customization. Thus, the user typically owns and maintains its own copy of the system, and configures the application locally to connect with its trading partners.

In both the traditional and more recent approaches, the executable software application is universal or "generic" as to all trading partner definitions (e.g., participants within a B2B process) before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner at some expense and time after which it is ready for execution to exchange data between the specific trading partner and the enterprise. For example, Amazon® may provide on its website specifications of how electronic data such as Purchase Orders and Invoices must be formatted for electronic data communication with Amazon, and how that data should be communicated with Amazon®. A supplier/enterprise is then responsible for finding a generic, commercially available software product that will comply with these communication requirements and then for configuring it appropriately. Accordingly, the software application will not be customized for any specific supplier until after that supplier downloads the software application to its computing network and configures the software application for the specific supplier's computing network, etc. The supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are visually modeled using a visual integration modeling system to customize a business integration for a specific enterprise before they arrive within the enterprise's computing network, and are delivered to the destination network in customized form. The Boomi® Application is an example of one such software application involving a visual integration modeling system. With Boomi® and other similar applications, an employee within an enterprise can connect to a website using a specially configured integration process code instructions flow modeling user interface of the visual integration modeling system to visually model business integration process code instructions via icons and a flowcharting process, via a local GUI or one provided via a web browser interface. During such a visual modeling process, the user would select from a predetermined set of process-representing visual elements or icons that are stored on a remote server in a library, such as the web server. By way of an example, the integration process code instructions could enable a bi-directional exchange of data between internal applications of an enterprise, between internal enterprise applications and external trading partners, or between internal enterprise applications and applications running external to the enterprise having distinct formats that may be wholly or partially incompatible.

A customized data integration software application creation system having this visual integration modeling system in an embodiment may allow a user to create a customized data integration software application by modeling data integration process code instructions flow using the graphical user interface as described. A visually modeled data integration process flow in embodiments of the present disclosure may visually model actions taken on data elements represented by visual icons pursuant to executable code instructions associated with the same, without displaying the code instructions themselves. In such a way, the graphical user interface may allow a user to understand the high-level summary via the visual modeling of what executable code instructions achieve, without having to read or understand the code instructions themselves. Similarly, by allowing a user to insert visual elements or visual icons representing portions of the data integration process code instructions into the visually modeled data integration process code instructions flow displayed on the graphical user interface, embodiments of the present disclosure allow a user to identify what she wants executable code instructions to achieve without having to write such executable code instructions. This can save expense and time of custom coding from programmers and make available an ecosystem library of visual elements usable and reusable in visual modeling of business process data integration.

Once a user has chosen what she wants an executable code instruction to achieve in embodiments herein, the code instructions capable of achieving such a task may be generated from the visual model of the visual integration modeling system. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, data structure formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions or proprietary schemas have also streamlined the methods of communication between various software components. An API may be generated from the visual model of the visual integration modeling system and may operate to communicate with a backend application to identify an action to be taken on a dataset that the backend application manages, or which is being transmitted for management to the backend application. Such an action and convention for identifying the dataset or its location may vary among APIs and their backend applications. For example, datasets may be visually modeled according to user-supplied or proprietary definitions. Each dataset may contain a user-defined or proprietary dataset field name, which may describe a type of information. Each user-defined or proprietary dataset field name may be associated with a dataset field value. In other words, datasets may be visually modeled using a field name:value pairing. For example, a given API dataset model in a visual model in a visual integration modeling system for a customer named John Smith may include a first dataset field name "f_name" paired with a first dataset field value "John," and a second dataset field name "l_name" paired with a second dataset field value "Smith." A user or an API in a visual model in a visual integration modeling system in an embodiment may define any number of such dataset field name/value pairs to describe datasets. Other example dataset field names in embodiments may include "dob" to describe date of birth, "ssn" to describe social security number, "phone" to describe a phone number, or "hair," "race," and "reward." In still other example embodiments, dataset field names may describe information required to fill out a purchasing order for a product offered for sale, such as "prod_ID" to describe an identifying number (e.g., stock keeping unit (SKU)) for the product, "prod_desc" to describe a description or name for the product, "shipping_address" to describe the address to which the product should be shipped upon purchase, or "unit_price" to describe the number of units the buyer wishes to purchase.

In embodiments described herein, multiple APIs, databases, or backend applications accessed via a single set of integration process code instructions visually modeled and generated with a visual integration modeling system may operate according to differing coding languages, dataset structures, dataset field naming conventions or standards. Different coding languages may use different ways of describing routines, data structures, object classes, variables, or remote calls that may be invoked and/or handled during execution of business data integration process code instructions that involve dataset field values managed by databases or by the backend applications such APIs serve in a visually modeled business data integration process code instructions once it is deployed. For example, in comparison to the API referenced directly above storing a field name/value of "f_name"/"John," a dataset for the same customer in a separate API may use a first dataset field name "FirstName." Thus, a single dataset field value (e.g., "John") may be described in visually modeled integration process code instructions using a plurality of dataset field names (e.g., "f_name" or "FirstName"), each adhering to the naming conventions set by databases, the APIs, applications, enterprises, or trading partners through or among which the dataset field value is programmed to integrate.

A user interacting with such an API in visually modeled business data integration process code instructions once it is deployed for a backend application may identify such dataset field values based on a description that may or may not include the actual dataset field name of the dataset field value. In some circumstances, a dataset field value may be identified through a search mechanism, or through navigation through a variety of menus, for example. The code sets incorporating the actual dataset field name for the dataset field value may be automatically generated from the visually modeled business data integration process based on this user interaction with an API. In other embodiments, the dataset field value may be identified in a similar way through interaction with the visual integration process code instructions flow user interface of the visual integration modeling system described herein. For example, the user may create two or more connector visual elements or icons, with each connector element representing a process taken by a different application or API (e.g., NetSuite®, Amazon-Price API® or Amazon Data API®). Because each of such visual connector elements or icons may describe actions taken by a different application or API, and different applications or APIs may adhere to differing code languages and dataset formats, each of a plurality of code sets generated based on these user-generated connector visual elements from the visually modeled business data integration process code instructions may be written in a different code set, and may identify dataset field values using different naming conventions, dataset formats, or storage structures. Thus, the code instructions for retrieving a given dataset field value from a first application or API may describe that dataset field value using a completely different dataset field name than the code instructions for transmitting the same dataset field value to a second application or API.

The Boomi® platform for visually modeling, displaying, and executing end-to-end business integration process code instructions among trading partners may trace or map dataset field values as they are accessed, copied, transferred, or otherwise manipulated during the transfer of such dataset field values within a visually modeled integration process. This may involve identifying which of these dataset field names was applied at each trading partner, application, or API involved in the visually modeled integration process, and the manipulation or action performed by each of these trading partners, applications, or APIs during the displayed integration process. This mapping may be performed by a user via a data lineage map graphical user interface (GUI), or may be automatically generated by the Boomi® platform based upon analysis of the code instructions generated by the Boomi® platform to reflect the series of process-representing visual elements or icons customized by a user to visually model that user's end-to-end business integration process. For example, users of the visual user interface describing the flow of the visually modeled integration process code instructions in embodiments described herein may use map elements to associate a first dataset field name for a dataset field value being retrieved from a first application or source with a second dataset field name under which that dataset field value will be stored at a second application or destination. Because a single set of integration process code instructions may transmit dataset field values between or among several sources and destinations, a process flow may include several of these mapping elements, sometimes placed in series with one another. This may result in a single dataset field value receiving several different dataset field names as it moves from various sources to various destinations throughout the visually modeled integration process. In some embodiments described herein, the Boomi® platform may draw on information supplied via these mapping elements to generate and display a data lineage map that illustrates, in chronological order with respect to the visually modeled integration process, the ways in which the dataset field name used to describe a single dataset field value changes throughout that process. Once such a data lineage map has been created, the Boomi® platform in embodiments may identify all dataset field names that have been used to describe a dataset field value as it is transmitted from an existing user to a trading partner.

Many users of the Boomi® platform may have used one or more of these GUIs to visually model previously executed data integration process code instructions for the transfer of dataset field values to various trading partners, or to track or map the ways in which such dataset field values have been accessed, manipulated, reformatted, or transmitted for storage at the trading partner storage location. In many cases, a plurality of users who have not previously connected or exchanged data with one another may have a shared or common trading partner with whom one or both users have performed these previously executed data integration process code instructions visually modeled via a visual integration modeling system. For example, many users have executed previous visually modeled data integration process code instructions with large online retailers such as Amazon®, or Walmart®. In order to perform execution of such a visually modeled data integration process code instructions with such a large retailer (e.g., Amazon®), several of the Boomi® platform users may have mapped the ways in which those users' dataset field values, such as dataset field values required to fill out a purchase order or invoice to facilitate sales of products through the Amazon® online store have been reformatted, renamed, or manipulated to meet the formatting requirements for the Amazon® API controlling such purchasing processes. Such a mapping process may also provide an identification of one or more of a user's dataset field values, identified by that user's dataset field name that are required to facilitate online sales between trading partners, including the Amazon® online store. Multiple of these maps for a plurality of users having a common trading partner (e.g., all Boomi® users trading with Amazon®) may be streamlined into a single map usable to visually model other business data integration process code instructions linking a first Amazon® trading partner dataset field name to a second Amazon® trading partner dataset field name, without any participation or involvement of these previously unconnected users, based solely on each of those trading partners' maps to the common Amazon® API format. Further, connector code sets for visually modeled business data integration process code instructions between previously unconnected users sharing a common trading partner may be automatically generated based on each of these user's previously executed integration process code instructions with the Amazon® API. A method of leveraging such automatically generated connectivity among previously unconnected users with a common trading partner may be used to facilitate or encourage future business transactions (e.g., sales and purchasing) among the many Boomi® platform users and the trading partner or partners.

The above commonalities for visually modeled business data integration process code instructions for plural users and trading partners may utilize an integration connectivity sales facilitation system in embodiments of the present disclosure to address this issue by allowing participating integration process users to search inventory of other participating integration process users for particular products offered for sale, and to automatically generate code instructions for a visually modeled integration process for transmitting any purchasing order dataset field values required for the purchase of those products among the previously unconnected integration process users. For example, integration process users may search for specific products offered for sale from other existing integration process users via a sales connectivity GUI of the integration connectivity sales facilitation system in embodiments of the present disclosure. Such a sales connectivity GUI may display an identification of another integration process user offering the searched product for sale (e.g., selling user), as well as the unit price and number of units available, for example. The integration process user wishing to purchase the product (e.g., purchasing user) may then request the integration connectivity sales facilitation system to automatically connect the purchasing user with the selling user for the exchange of dataset field values required for a purchasing order to purchase the searched product from the selling user via a visually modeled data integration process. Upon agreement or approval of such connectivity by the selling user, the integration connectivity sales facilitation system in embodiments herein may automatically generate connector code instructions of a purchase order data integration process for transferring and renaming any dataset field values required for such a purchase order to a storage location managed by the selling user in whatever format is required by the selling user, based on the lineage maps of visually modeled business data integration process code instructions previously displayed as described above. The integration connectivity sales facilitation system may further transmit these connector code instructions, along with a runtime engine for remote execution of those connector code instructions at the purchasing user's enterprise upon deployment of the new business data integration process code instructions based on visually modeled business integration processes, for example.

FIG. 1 is a block diagram illustrating an information handling system, according to an embodiment of the present disclosure. As described herein, the integration connectivity sales facilitation system 185 in an embodiment may allow participating integration process users to search inventory of other participating integration process users for particular products offered for sale, and to automatically generate code instructions for a business data integration process for transmitting any purchasing order dataset field values required for the purchase of those products among the previously unconnected integration process users. These automatically generated code instructions in an embodiment may be generated based on connector code sets from previously executed visually modeled data integration process code instructions modeled and generated by a visual integration modeling system 182 of the integration application management system 180 for exchange of dataset field values among various users sharing a common trading partner, who have not yet conducted business or data integration with one another.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc., or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the integration application management system 180 or the integration connectivity sales facilitation system 185, the visual integration modeling system 182, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may further include a graphical user interface 112. The graphical user interface 112 in an embodiment may provide a visual designer environment permitting a user to define process flows between applications/systems, such as between trading partner and enterprise systems, and to visually model customized business data integration process code instructions via a video display 109. The graphical user interface 112 in an embodiment may provide a menu of pre-defined user-selectable visual elements or icons and permit the user to arrange them as appropriate to visually model a process and may be displayed on the video display 109. The visual elements may include visual, drag-and-drop icons representing specific units of work required as part of the visually modeled integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular dataset to be sent or received, for example, a Purchase Order. The providing of this input by the user results in the integration application management system's 180 receipt of such user-provided information as an integration process data profile code set.

In some embodiments, the graphical user interface 112 may also allow users to generate data lineage maps tracking the ways in which dataset field values are manipulated, renamed, accessed, or transmitted during execution of visually modeled integration process code instructions on a visual integration modeling system 182. As described herein, the Boomi® platform is a visual integration modeling system for modeling, displaying, and providing for executing end-to-end business integration process code instructions among trading partners and may trace or map dataset field values as they are accessed, copied, transferred, or otherwise manipulated during the transfer of such dataset field values within the visually modeled integration process. This may involve identifying which of these dataset field names was applied at each trading partner, application, or API involved in the visually modeled business data integration process, and the manipulation or action performed by each of these trading partners, applications, or APIs during the visually modeled integration process. This mapping may be performed by a user via a data lineage map graphical user interface (GUI) 112, the visual integration modeling system 182 or may be automatically generated by the integration application management system 180 based upon analysis of the code instructions generated by the visual integration modeling system 182. The visual integration modeling system 182 may be part of the integration application management system 180 and reflect the series of process-representing visual elements customized by a user to visually model that user's end-to-end business integration process. The integration application management system 180 in an embodiment may generate and display, via a data lineage map GUI 112, a data lineage map that illustrates, in chronological order with respect to the visually modeled integration process, the ways in which the dataset field name used to describe a single dataset field value changes throughout that visually modeled data integration process. Once such a data lineage map has been created, the integration application management system 180 in embodiments may identify all dataset field names that have been used to describe a dataset field value as it is transmitted from an existing user to a trading partner via a deployed business integration process set of code instructions.

The information handling system 100 may execute code instructions 187, via one or more hardware processing resources, such as for the integration application management system 180, the visual integration modeling system 182, or the integration connectivity sales facilitation system 185, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or other hardware controllers or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing, via hardware processing resources, an integration application management system 180, the visual integration modeling system 182, or the integration connectivity sales facilitation system 185, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 120 via a dedicated link, a network AP or base station in an embodiment. The network 120 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 120 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 120, one or more access points (APs) or base stations for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 120, such that the information handling system 100 may be in communication with network 120 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN bands which may be shared communication frequency bands with WWAN protocols in some embodiments. The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources.

Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 120. Further, the instructions 187 may be transmitted or received over the network 120 via the network interface device 160. The information handling system 100 may include a set of instructions 187 that may automatically generate code instructions for an integration process for transmitting any purchasing order dataset field values required for the purchase of certain products among previously unconnected integration process users based on previously executed visually modeled business data integration process code instructions. For example, instructions 187 may include a particular example of an integration application management system 180, the visual integration modeling system 182, or the integration connectivity sales facilitation system 185, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The integration application management system 180, the visual integration modeling system 182, or the integration connectivity sales facilitation system 185 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the integration application management system 180, the visual integration modeling system 182 or the integration connectivity sales facilitation system 185, firmware or software algorithms, processes, and/or methods may be stored here. Such code instructions 187 may allow participating integration process users to search inventory of other participating integration process users for particular products offered for sale, and to automatically generate code instructions for a business integration process for transmitting any purchasing order dataset field values required for the purchase of those products among the previously unconnected integration process users based on previously executed visually modeled business data integration process code instructions. These automatically generated code instructions in an embodiment may be generated based on connector code sets from previously executed and visually modeled integration process code instructions generated by the integration application management system 180, or the visual integration modeling system 182 for exchange of dataset field values among various users sharing a common trading partner, who have not yet conducted business or data integration with one another.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the integration application management system 180 or the integration connectivity sales facilitation system 185 may be stored in static memory 103, or the drive unit 107 on a computer-readable medium 186 such as a flash memory or magnetic disk in an example embodiment.

The disk drive unit 107, static memory 103, and computer readable medium 186 of the integration application management system 180, the visual integration modeling system 182, or the integration connectivity sales facilitation system 185 also utilize space for data storage such as an information handling system for managing locations of executions of customized integration process code instructions in endpoint storage locations. Connector code sets, and trading partner code sets may also be stored in part in the disk drive unit 107, static memory 103, or computer readable medium 186 accessed or used by the integration application management system 180, the visual integration modeling system 182, or the integration connectivity sales facilitation system 185 in an embodiment. In other embodiments, data profile code sets, and run-time engines may also be stored in part or in full in the disk drive unit 107, static memory 103, or computer readable medium 186. Further, the instructions 187 of the integration application management system 180, the visual integration modeling system 182, or the integration connectivity sales facilitation system 185 may embody one or more of the methods or logic as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory.

Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® hardware processors, ARM® hardware processors, Qualcomm® hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
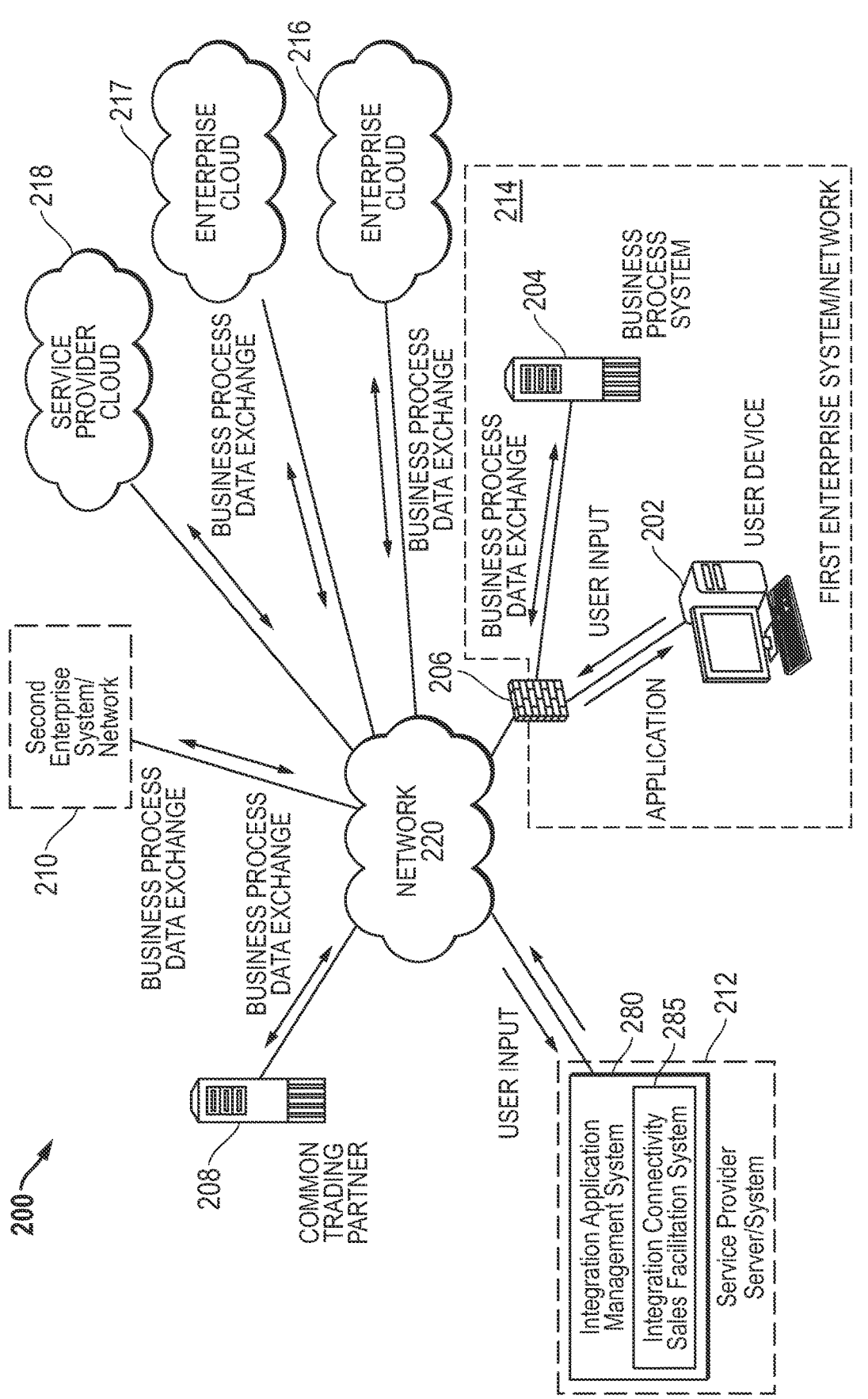
FIG. 2 is a block diagram illustrating a simplified integration network according to an embodiment of the present disclosure.

FIG. 2 is a graphical diagram illustrating a simplified integration network 200 including a service provider system/server 212 and a first enterprise system/network 214 in an embodiment according to the present disclosure. Actual integration network topology could be more complex in various other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 220, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 220. In an embodiment, the user device 202 may be positioned within a first enterprise network 214 behind the enterprise network's firewall 206, which may be of a conventional type. As a further aspect of an embodiment, the first enterprise network 214 may include a business process system 204, which may include conventional computer hardware and commercially available business process software such as QuickBooks, SalesForce's® Customer Relationship Management (CRM) Platform, Oracle's® Netsuite Enterprise Resource Planning (ERP) Platform, Infor's® Warehouse Management Software (WMS) Application, or many other types of databases.

In an embodiment, the integration network 200 may further include trading partner 208 and second enterprise system/network 210 operating conventional hardware and software for receiving and/or transmitting data relating to business-to-business transactions. For example, Amazon® may operate trading partner system 208 to allow for issuance of purchase orders to suppliers, such as the first enterprise 214, and to receive invoices from suppliers, such as the first enterprise 214, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP).

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the first enterprise network 214. The service provider system/server 212 in an embodiment may host a visual integration process code instructions-modeling user interface in an embodiment, via the integration application management system 280, which may also be manipulated via the integration connectivity sales facilitation system 285 to automatically generate integration process-representing visual elements. Such visual integration process code instructions-modeling user interface may allow a user, the integration application management system 280, or the integration connectivity sales facilitation system 285 to visually model integration process code instructions including one or more sub-processes for data integration through a business process data exchange between a first enterprise system/network 214 and outside entities such as trading partner system 208, 210, or one or more enterprise clouds 216 or 217 or service provider cloud 218 or between multiple internal applications operating at the business process system 204. The integration process code instructions visually modeled in the visual integration process-modeling user interface in an embodiment may be a single business process data exchange shown in FIG. 2, or may include several business process data exchanges shown in FIG. 2. For example, the common trading partner 208 may be involved in a business process data exchange via network 220 with the first enterprise system/network 214 or the second enterprise system/network 210. In other example embodiments, the first enterprise system/network 214 may be involved in a business process data exchange via network 220 with a service provider located in the cloud 218, and/or an enterprise cloud location 216 or 217. For example, one or more applications between which a dataset field value may be transferred, according to embodiments described herein, may be located remotely from the first enterprise system 214, at a service provider cloud location 218, or one or more enterprise cloud locations (e.g., 216 or 217).

The integration application management system and visual integration modeling system having an integration process code instructions-modeling user interface, used with the integration connectivity sales facilitation system 285 in an embodiment may visually model one or more business process data exchange code instructions via network 220 within integration process code instructions by adding one or more visual connector integration elements corresponding to code sets of a visually modeled integration process flow. These connector integration elements in an embodiment may visually model the ways in which a user wishes data to be accessed, moved, and/or manipulated during execution of the one or more business process data exchange code instructions. Each connector element the integration connectivity sales facilitation system 285 or the user adds to the integration process code instructions flow diagram in the visual integration modeling system in an embodiment may be associated with a pre-defined subset of code instructions stored at the service provider systems/server 212 in an embodiment. Upon the user visually modeling the integration process, the service provider system/server 212 in an embodiment may generate a run-time engine capable of executing the pre-defined subsets of code instructions represented by the connector integration elements chosen by the user or indicated by the integration connectivity sales facilitation system 285. The runtime engine may then execute the subsets of code instructions in the order defined by the visually modeled flow of the visual connector integration elements given in the visual integration process code instructions flow diagram. In some embodiments, the integration connectivity sales facilitation system 285 may define the order in which such subsets of code instructions are executed by the runtime engine without creation of or reference to a visual integration process code instructions flow diagram. In such a way, integration process code instructions may be executed without the user having to access, read, or write the code instructions of such a custom-programmed business data integration process.

In other aspects of an embodiment, a user may initiate business process data exchange code instructions between one cloud service provider 218 and one cloud enterprise 216, between multiple cloud service providers 218 with which the first enterprise system 214 has an account, or between multiple cloud enterprise accounts 216 or 217. For example, first enterprise system 214 may have an account with multiple cloud-based service providers 218, including a cloud-based SalesForce® CRM account and a cloud-based Oracle® Netsuite® account or enterprise clouds (e.g., 216 or 217) of one or more users or trading partners. In such an embodiment, the first enterprise system 214 may initiate business process data exchanges between itself, the Sales-Force® CRM service provider and the Oracle® Netsuite service provider.

As described herein, many users of the Boomi® platform may have previously executed visually modeled business process data exchange code instructions for the transfer of dataset field values to various trading partners, or to track or map the ways in which such dataset field values have been accessed, manipulated, reformatted, or transmitted for storage at the trading partner storage location. In many cases, a plurality of users who have not previously connected or exchanged data with one another may have a shared or common trading partner with whom both users have performed these previously executed visually modeled data integration process code instructions. For example, the first enterprise system/network 214 in an embodiment, as well as the second enterprise system/network 210 may have both executed previous data integration process code instructions with large online retailers such as Amazon®, or Walmart®, which may be represented in FIG. 2 as the common trading partner 208 or 210 or cloud systems (e.g., 216). In order to perform such data integration process code instructions with such a large retailer 208 or 210 or cloud systems 216 or 217 (e.g., Amazon®), first enterprise user 214 and second enterprise user 210 (which has not yet connected to the enterprise user 214) may have mapped the ways in which those users' dataset field values, such as dataset field values required to fill out a purchase order or invoice to facilitate sales of products through the Amazon® online store have been reformatted, renamed, or manipulated to meet the formatting requirements for the Amazon® API controlling such purchasing processes. Multiple of these maps for a plurality of users or trading partners (e.g., 214 and 210) having a common trading partner 208 (e.g., Amazon®) may be merged and streamlined into a single data lineage map linking a first dataset field name managed by first enterprise system 214 to a second dataset field name managed by the second enterprise system/network 210, without any participation or involvement of these previously unconnected users 214 and 210, based solely on each of those enterprise systems' data lineage maps to the common API format required by the common trading partner 208. These merged data lineage maps may be used to generate a new end-to-end business integration process code set based on previously visually modeled business integration process code sets from the users and trading partners 208, 210, and 214. In some embodiments, the generation of a new end-to-end business integration process code set may be based on each individual data lineage map in part or wholly from previous visually modeled business integration process code sets with some linking of those codes sets via a common trading partner.

The integration connectivity sales facilitation system operating at the service provider system/server 212 in an embodiment may allow participating integration process users (e.g., 214) to search inventory of other participating integration process users (e.g., 210) or enterprise clouds 216 and 217 or other users linked by business data integration process code instructions to a common trading partner 208 for particular products offered for sale, and to automatically generate code instructions for a new merged business data integration process for transmitting any purchasing order dataset field values required for the purchase of those products among the previously unconnected integration process users (e.g., 214 and 210 or 216 and 217). The automatically generated code instructions for the new, merged business integration process are based on merged data lineage mapping from previous visually modeled business integration process code instructions. For example, first enterprise user 214 may search for specific products offered for sale from second enterprise system 210 via a sales connectivity GUI displayed via the user device 202 in an embodiment with the auto-generated code instructions of the new merged business data integration. Such a sales connectivity GUI may display an identification of the second enterprise system 210 offering the searched product for sale (e.g., selling user), as well as the unit price and number of units available, for example. The first enterprise system 214 wishing to purchase the product (e.g., purchasing user) may then request the integration connectivity sales facilitation system 285 operating at the first service provider system/server 212 to automatically connect purchasing enterprise user 214 with the selling enterprise user 210 for the exchange of dataset field values required for a purchasing order to purchase the searched product from the selling user 210.

Upon agreement or approval of such connectivity by the selling user 210, the integration connectivity sales facilitation system 285 operating at the service provider system/ server 212 in an embodiment may automatically generate a series of process-representing visual elements within the integration process-modeling user interface (e.g., as described in greater detail below with respect to FIG. 3) that represent the new, merged end to end business integration process code instructions for reformatting and transmitting purchase order dataset field values required for the purchase of the selected product by the purchasing user 214 from the selling user 210 to a storage location maintained at the second enterprise system/network 210 in a data format required for storage at the second enterprise system/network 210. The integration connectivity sales facilitation system 285 or the integration application management system 280 in such an embodiment may also automatically generate connector code instructions of a new, merged purchase order data integration process for transferring and renaming any dataset field values required for such a purchase order to a storage location managed by the selling user 210 in whatever format is required by the selling user 210. The integration connectivity sales facilitation system 285 operating at the service provider system/server 212 may further transmit these new, merged connector code instructions, along with a runtime engine for remote execution of those connector code instructions at the purchasing user's enterprise 214, for example.

Figure 3:
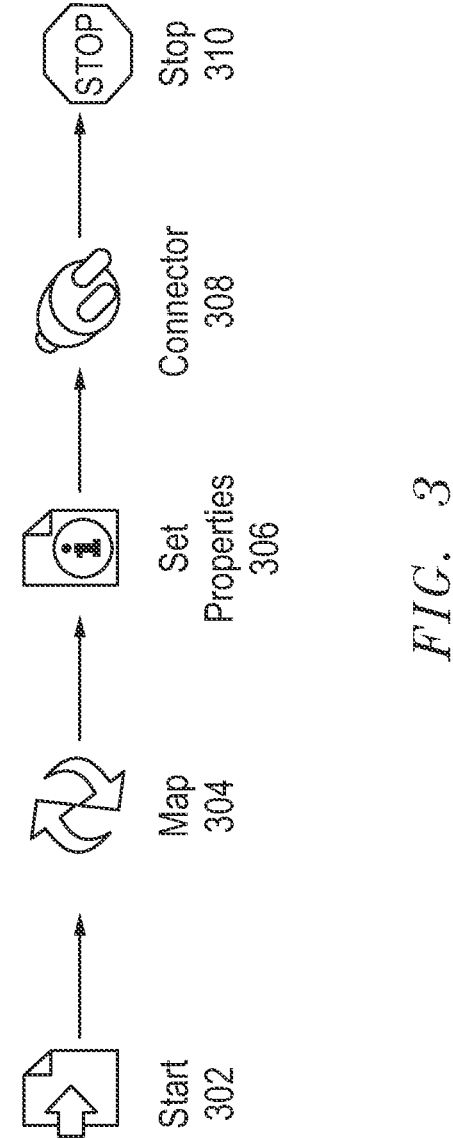
FIG. 3 is a graphical diagram illustrating a user-generated flow diagram of an integration process modeled with a visual integration modeling system according to an embodiment of the present disclosure.

FIG. 3 is a graphical diagram illustrating a visual model for a user-generated flow diagram of an integration process for exchange of electronic data records according to an embodiment of the present disclosure. As described herein, the integration application management system for executing end-to-end business integration process code instructions among trading partners may include a visual integration modeling system code instructions for generating a visually modeled flow diagram as shown in FIG. 3. The integration application management system in an embodiment may also trace or map dataset field values as they are accessed, copied, transferred, or otherwise manipulated during the transfer of such dataset field values within a visually modeled integration process. This may involve identifying which of these dataset field names was applied at each trading partner, application, or API involved in the visually modeled business data integration process, and the manipulation or action performed by or for each of these trading partners, applications, or APIs during the visually modeled business data integration process. This data lineage mapping may be performed via a data lineage map graphical user interface (GUI) in part, as described in greater detail below with respect to FIG. 4, or may be automatically generated by the integration application management system based upon analysis of the code instructions generated to reflect a series of process-representing visual elements customized by a user via the GUI 300 described with respect to FIG. 3 to visually model that user's end-to-end business integration process with the visual integration modeling system code instructions. The visual elements (e.g., 302, 304, 306, 308, and 310) displayed within FIG. 3 may represent one or more steps in data integration process code instructions for transferring data from a first enterprise user (e.g., purchasing user) to a common trading partner (e.g., Amazon®) in a first embodiment. Another set of visual elements similar to those of FIG. 3 may represent steps in data integration process code instructions for transferring data from a second enterprise user (e.g., selling user) to that same common trading part (e.g., Amazon®) in a second embodiment, for example.

The visually modeled flow diagram in an embodiment may be displayed within a portion of integration process code instructions flow modeling graphical user interface (GUI) 300 with the visual integration modeling system code instructions that allows the user to build the process flow, deploy the integration process code instructions visually modeled thereby, and manage dataset field names manipulated by such business data integration process code instructions. For example, business data integration process code instructions in an embodiment may include code instructions for submitting or receiving a purchase order or an invoice with data format conversions for a particular product purchased from or sold to a trading partner with whom a user regularly conducts sales transactions (e.g., Amazon®). A user may generate a flow diagram with the visual integration modeling system code instructions in an embodiment by providing a chronology of process-representing integration elements via the use of integration process code instructions-modeling user interface. In some embodiments, the integration process-modeling user interface may take the form of a graphical user interface. In such embodiments, the user-selectable elements representing integration sub-processes (e.g., connector integration elements) may be visual icons such as 302, 304, 306, 308, or 310.

An integration process code instructions-modeling user interface of a visual integration modeling system in an embodiment may provide a design environment permitting a user to visually model and define business data integration process flows between applications/systems, such as between trading partner and enterprise systems, between on-site data centers and cloud-based storage modules, or between multiple applications, and to visually model a customized business integration process set of code instructions. Such integration process code instructions-modeling user interface of a visual integration modeling system in an embodiment may provide a menu of pre-defined user-selectable elements representing integration sub-processes and permit the user or the integration connectivity sales facilitation system to arrange them as appropriate to visually model a full set of code instructions for a business data integration process. For example, in an embodiment in which the integration process-modeling user interface is a graphical user interface, the visual elements may include visual, drag-and-drop icons representing specific units of work (known as process components) required as part of the later deployed business data integration process code instructions. Such a process component associated with a visual icon in an embodiment may include invoking an application-specific connector to access, and/or manipulate data. In other embodiments, process components associated with visual icons may include tasks relating to transforming data from one format to another, routing data down multiple paths of execution by examining the contents of the data, business logic validation of the data being processed, etc.

Each process component associated with a visual icon as represented by integration sub-process icons or visual elements may be identifiable by a process component type, and may further include an action to be taken with associated code instructions for the process component and the visual icon. For example, a process component associated with a visual icon may be identified as a "connector" component. Each "connector" component (e.g., 308), when chosen and added to the process flow in the integration process-modeling user interface of a visual integration modeling system, may allow a user to choose from different actions the "connector" component (e.g., 308) may be capable of taking on the data as it enters that process step when deployed as code instructions. Further the integration-process modeling user interface in an embodiment may allow the user to choose the dataset or data element upon which the action will be taken when deployed as code instructions. The action and data element the user chooses may be associated with a connector code set, via the integration application management system, which may be pre-defined and stored at a system provider's memory in an embodiment.

For example, a user in an embodiment may create and customize a "connector" component (e.g., 308) to represent the action of submitting a purchase order or an invoice to a trading partner with whom the user regularly does business (e.g., Amazon®). More specifically, the "connector" component (e.g., 308) may define a storage location at which the trading partner receives purchase orders for processing (e.g., as defined via an application programming interface (API) in some cases), as well as identification of a product for purchase or a number of a units of that product the user wishes to purchase. This may require the transmission of one or more datasets describing this information (e.g., storage location, product identification, number of units for purchase). A dataset may include a dataset field name describing the type of information stored therein, and a dataset field value providing a unique subset of information within that category or of that type. For example, a dataset describing a product identification may include a dataset field name "product_description," and a dataset field value "purple furby." In other examples, a dataset describing a product identification may include a dataset field name "product_ID" or "product_SKU," and a dataset field value of a catalog number for a purple furby or the stock keeping unit (SKU) number for a purple furby in stock for purchase, respectively.

The integration application management system in an embodiment may generate a connector code set capable of submitting datasets containing information required to fill out a purchase order or a sales invoice in a format required by or easily processed by a specific trading partner (e.g., Amazon®), using the datasets identified within the customized connector element (e.g., 308) described directly above. The integration application management system operating at least partially at a system provider server/system in an embodiment may generate a dynamic runtime engine for executing these pre-defined subsets of code instructions correlated to each individual process-representing visual element (process component) (e.g., 302, 304, 306, 308, or 310) in a given flow diagram visual model 300 in the order in which they are visually modeled in the given flow diagram visual model 300, or by the integration connectivity sales facilitation system generating a flow diagram visual model 300 to connect users having a common trading partner with one another from visually modeled and previously executed business data integration process code instructions.

In an embodiment, a user may choose a process component it uses often when interfacing with a specific trade partner or application (e.g., Amazon® API), and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often submits purchase orders or invoices to an online or cloud-based retailer or sales platform (e.g., Amazon®), the user may create a database connector process component, associated with a pre-built connector code set that may be used with any database, then tailor the database connector process component to specifically interface with Amazon® and customizable among plural users wanting to interface with the common trading partner by adding process component parameters associated with one or more APIs routinely used by Amazon® to facilitate sales and purchases via the online Amazon® sales platform. If the user uses this process component in several different integration processes, the user may wish to save this process component for later use by saving it as an Amazon® process component. In the future, if the user wishes to use this component, the user may simply select the Amazon® component, rather than repeating the process of tailoring a generic database connector process component with the specific parameters defined above.

As shown in FIG. 3, such process-representing visual elements may include a start element 302, a map element 304, a set properties element 306, a connector element 308, and a stop element 310. Other embodiments may also include a branch element, a decision element, a data process element, or a process call element, for example. A connector element 308, and a start element 302 in an embodiment may represent a sub-process of integration process code instructions describing the accessing and/or manipulation of data for a business data integration process in the visual model flow diagram 300. The start element 302 in an embodiment may also operate as a connector element.

In an embodiment, a start element 302 may operate to begin a process flow, and a stop element 310 may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. For example, the user of the visual integration modeling system code instructions or the integration connectivity sales facilitation system may use a connector element to define a connection (e.g., a trading partner or API managing data upon which action is to be taken), and the action to be taken. This may happen with a user manually modeling a business data integration process set of code instructions or an integration connectivity sales facilitation system automatically generating a framework flow diagram 300 for customization from previously visually modeled business data integration code instructions. A user may use a start element 302 to further define a location of such data, according to the language and storage structure understood by the application managing such data. In an embodiment, dataset field values to be accessed at the start element 302 may be identified by a dataset field name given in a format that adheres to the code language and storage structure used by the application/location/enterprise at which such a dataset field value may be accessed.

A map element 304, or TransformMap element in an embodiment, may associate a first dataset field name for a dataset field value being retrieved from a first application or source with a second dataset field name under which that dataset field value will be stored at a second application or destination. Because a single set of integration process code instructions may transmit dataset field values between or among several sources and destinations, a process flow may include several of these mapping elements 304, sometimes placed in series with one another. This may result in a single dataset field value receiving several different dataset field names as it moves from various sources to various destinations throughout the integration process.

A set properties element 306 in an embodiment may allow the user to set values identifying specific files or datasets. Set properties elements in an embodiment may associate a user-defined property with a user-defined parameter, similar to a key-value pair definition. For example, a user or the integration connectivity sales facilitation system in an embodiment may use a set properties element to set the property "dataset field name" to a parameter "Shipping Address," in order to identify a specific dataset field value entitled "Shipping Address." In some embodiments, this may invoke a call to an API controlling access to the application/location/enterprise managing such a dataset field value to search for a dataset field value having a dataset field name that matches one or more of these descriptive phrases, rather than identifying a dataset field value having the exact dataset field name "Shipping Address." For example, a user entering the value "Shipping Address" in an embodiment may invoke a call to locate dataset field values having dataset field names "Shipping_Address," "shipping_address," "ShippingAddress," "SAddress," etc.

The code sets associated with such property and parameter fields in an embodiment may be written or generated in any programming code language, so long as the code language in which the property is defined matches the code language in which the parameter is also defined. Similarly, the code sets associated with the connection location and action to be taken within a connector element may be written or generated in any programming code language so long as they are consistent with one another. Thus, the process-representing visual elements in an embodiment may be programming language-agnostic. Using such process-representing elements in an embodiment, a user may visually model end-to-end integration process code instructions between multiple applications that each use different naming conventions and storage structures for storage of dataset field values via the visual integration modeling system code instructions of embodiments herein. As a result, a single dataset field value accessed at the start element 302 and transmitted to a second location at the connector element 308 in an embodiment may be identified at the start element 302 with a completely different dataset field name (e.g., "Shipping_address") than the dataset field name (e.g., "Send_To") used to identify the exact same dataset field value at the connector element 308.

A connector element 308 may operate in a similar manner to the start element 302 to define an action to be taken on an identified dataset. Connector elements 308 in an embodiment may differ from start elements 302 in that they do not necessarily occur at the beginning of business data integration process code instructions. The stop element 310 in an embodiment may operate to terminate the business data integration process code instructions. Users of the visual user interface 300 describing the flow of the integration process code instructions for the end-to-end business data integration process in an embodiment may use start element 302, map element 304, and connector element 310 (e.g., defining the storage location and format for such storage at the receiving user's enterprise) to associate a first dataset field name for a dataset field value being retrieved from a first application or source with a second dataset field name under which that dataset field value will be stored at a second application or destination. Because a single set of integration process code instructions may transmit dataset field values between or among several sources and destinations, a process flow may include several of these visual process-representing elements, sometimes placed in series with one another. This may result in a single dataset field value receiving several different dataset field names as it moves from various sources to various destinations throughout the integration process. In an embodiment, the integration application management system may draw on information supplied via these process-representing visual elements to generate and display a data lineage map that illustrates, in chronological order with respect to the integration process, the ways in which the dataset field name used to describe a single dataset field value changes throughout those business data integration process code instructions, as described in greater detail below with respect to FIG. 4. Once such a data lineage map has been created, the integration application management system in an embodiment may identify all dataset field names that have been used to describe a dataset field value as it is transmitted from an existing user to a trading partner.

The integration application management system in an embodiment may associate each of the visual elements within the integration process-modeling graphical user interface of the visual integration modeling system code instructions with a set of code instructions written in a machine-readable, executable format for each process element code set. For example, the integration application management system in an embodiment may associate the start element 302 with a connector code set, written or generated in a human-readable, machine-executable code language (e.g., JSON or XML), that includes code instructions for accessing a dataset field value associated with a user-specified dataset field name defined within the start element 302. Upon generation and storage within a memory of each of the code sets associated with each of the visual elements (e.g., 302, 304, 306, 308, or 310) within the integration process-modeling graphical user interface 300 in an embodiment, the integration application management system may further generate a runtime engine capable of executing each of these code sets. The integration application management system in an embodiment may transmit the runtime engine and each of the code sets for execution of the business data integration process code instructions visually modeled by the user or auto-generated via the integration process-modeling graphical user interface of the visual integration modeling system code instructions for execution of the integration process code instructions at a remote location (e.g., behind the firewall of a user's enterprise system/network).

The series of process-representing visual elements shown in FIG. 3 in a first embodiment may represent a first set of end to end common partner business data integration process code instructions for transferring and renaming a purchase order dataset field value (e.g., product name, product identification, product price) stored at a first enterprise user storage location (e.g., 214 of FIG. 2) under a first dataset field name in a first data format to a common trading partner storage location (e.g., 208 of FIG. 2, or Amazon®) identified by a common trading partner dataset field name in a common trading partner data format (e.g., Amazon® API formatting requirements). As described herein, this first enterprise system/network (e.g., 214 of FIG. 2) may enter into an agreement to purchase a selected product from a second enterprise system/network (e.g., 210 of FIG. 2), which also routinely performs business with the common trading partner (e.g., 208 of FIG. 2, or Amazon®). In such a case, the first enterprise system/network (e.g., 214 of FIG. 2) may be referred to herein as a purchasing enterprise user, and the second enterprise system/network (e.g., 210 of FIG. 2) may be referred to herein as a selling enterprise user. Further, the series of process-representing visual elements shown in FIG. 3 in such a first embodiment may be said to represent a first set of end to end common partner business data integration process code instructions between the purchasing enterprise user (e.g., 214) and the common trading partner (e.g., 208) for transferring and renaming a purchase order dataset field value stored at the purchasing user storage location (e.g., 214 of FIG. 2) under a first dataset field name in a first data format to a common trading partner storage location (e.g., 208 of FIG. 2) identified by a common trading partner dataset field name in a common trading partner data format.

In such a first embodiment, the start element 302 may include purchasing user-specified information identifying one or more purchasing order dataset field values according to a purchasing order dataset field name given in a first data format defined by the purchasing user (e.g., 214). The connector element 308 in such a first embodiment may include common trading partner-specified information identifying a common trading partner dataset field name given in a common trading partner data format (e.g., data format required by the Amazon® API) under which the transferred purchase order dataset field value transmitted from the first enterprise user (e.g., 214) may be stored at the common trading partner (e.g., 208). The purchasing user (e.g., 214) in such an embodiment may choose to make one or more of the visual elements (e.g., 302 or 308) public for review by the integration application management system or other enterprise users (e.g., 210).

In a second embodiment, the series of process-representing visual elements shown in FIG. 3 may represent a second set of end to end common partner business data integration process code instructions for transferring and renaming a purchase order dataset field value (e.g., product name, product identification, product price) stored at a second enterprise user storage location (e.g., 210 of FIG. 2) under a second dataset field name in a second data format to a common trading partner storage location (e.g., 208 of FIG. 2, or Amazon®) identified by a common trading partner dataset field name in a common trading partner data format (e.g., Amazon® API formatting requirements). In a situation in which the second enterprise user (e.g., 210) has agreed to sell one or more products to the first enterprise user (e.g., 214), the series of process-representing visual elements shown in FIG. 3 in such a second embodiment may be said to represent a second set of end to end common partner business data integration process code instructions between the selling enterprise user (e.g., 210) and the common trading partner (e.g., 208) for transferring and renaming a purchase order dataset field value stored at the selling user storage location (e.g., 210 of FIG. 2) under a second dataset field name in a second data format to a common trading partner storage location (e.g., 208 of FIG. 2) identified by a common trading partner dataset field name in a common trading partner data format.

In such a second embodiment, the start element 302 may include selling user-specified information identifying one or more purchasing order dataset field values according to a purchasing order dataset field name given in a second data format defined by the selling user (e.g., 210). The connector element 308 in such a second embodiment may include common trading partner-specified information identifying a common trading partner dataset field name given in a common trading partner data format (e.g., data format required by the Amazon® API) under which the transferred purchase order dataset field value transmitted from the second enterprise user (e.g., 210) may be stored at the common trading partner (e.g., 208). The selling user (e.g., 210) in such an embodiment may choose to make one or more of the visual elements (e.g., 302 or 308) public for review by the integration application management system or other enterprise users (e.g., 214).

Upon agreement by both the purchasing user (e.g., 214) and the selling user (e.g., 210) to transact business with one another, the integration connectivity sales facilitation system in an embodiment of the present disclosure may automatically generate a third series of process-representing visual elements representing connector code instructions of a purchase order data integration process for transferring and renaming the purchase order dataset field value from the purchasing user to the selling user storage location in the second data format. For example, upon agreement or approval of such connectivity by the selling user (e.g., 210 of FIG. 2), the integration connectivity sales facilitation system operating at the service provider system/server in an embodiment may automatically generate a series of process-representing visual elements within the integration process-modeling user interface that represent a set of end to end business data integration process code instructions for reformatting and transmitting purchase order dataset field values required for the purchase of the selected product by the purchasing user (e.g., 214) from the selling user (e.g., 210) to a storage location maintained at the second enterprise system/network (e.g., 210) in a data format required for storage at the second enterprise system/network (e.g., 210).

Thus, the series of process-representing visual elements shown in FIG. 3 in a third embodiment may represent a third set of end to end common partner business data integration process code instructions for transferring and renaming a purchase order dataset field value (e.g., product name, product identification, product price) stored at the purchasing enterprise user storage location (e.g., 210 of FIG. 2) under the first dataset field name in the first data format to the selling enterprise user storage location (e.g., 210 of FIG. 2) identified by the selling enterprise user dataset field name in the selling enterprise user data format. In such a third embodiment, the start element 302 may include the same purchasing user-specified information given in the start element 302 described above with respect to the first embodiment, identifying one or more purchasing order dataset field values according to a purchasing order dataset field name given in a first data format defined by the purchasing user (e.g., 214). The connector element 308 in such a third embodiment may include the same selling user-specified information given in the start element 302 described above with respect to the second embodiment, identifying a purchasing order dataset field name given in the second data format defined by the selling user (e.g., 210) under which the purchasing user's purchase order dataset field value may be stored at the selling user.

In yet another embodiment, the series of process-representing visual elements shown in FIG. 3 may represent a modifiable portion of the third set of end to end common partner business data integration process code instructions that functions as a integration process flow framework that is easily customizable by a purchasing user or selling user for transferring and renaming a purchase order dataset field value (e.g., product name, product identification, product price) stored at the purchasing enterprise user storage location (e.g., 210 of FIG. 2) under the first dataset field name in the first data format to the selling enterprise user storage location (e.g., 210 of FIG. 2) identified by the selling enterprise user dataset field name in the selling enterprise user data format. In such an embodiment, connector element 308 may be automatically generated by the integration connectivity sales facilitation system to include the same selling user-specified information given in the start element 302 described above with respect to the second embodiment, identifying a purchasing order dataset field name given in the second data format defined by the selling user (e.g., 210) under which the purchasing user's purchase order dataset field value may be stored at the selling user. Also in such an embodiment, the start element 302 may be modifiable by the purchasing user to include information identifying one or more purchasing order dataset field values according to a purchasing order dataset field name given in a first data format defined by the purchasing user (e.g., 214).

In such a way, the integration connectivity sales facilitation system in an embodiment may provide a flow diagram of integration flow diagram of connector element icons in a visual integration modeling system as a framework for a purchase order integration process associated with business data purchase order data integration process code instructions. The purchasing user can easily finalize the information for the start element 302 in such an embodiment via the visual modeling integration process modeling GUI 300. This modeled integration process flow diagram 300 may then be used to generate business data integration process code instructions for a purchase order between the purchasing user (e.g., 214) and the selling user (e.g., 210).

Figure 4:
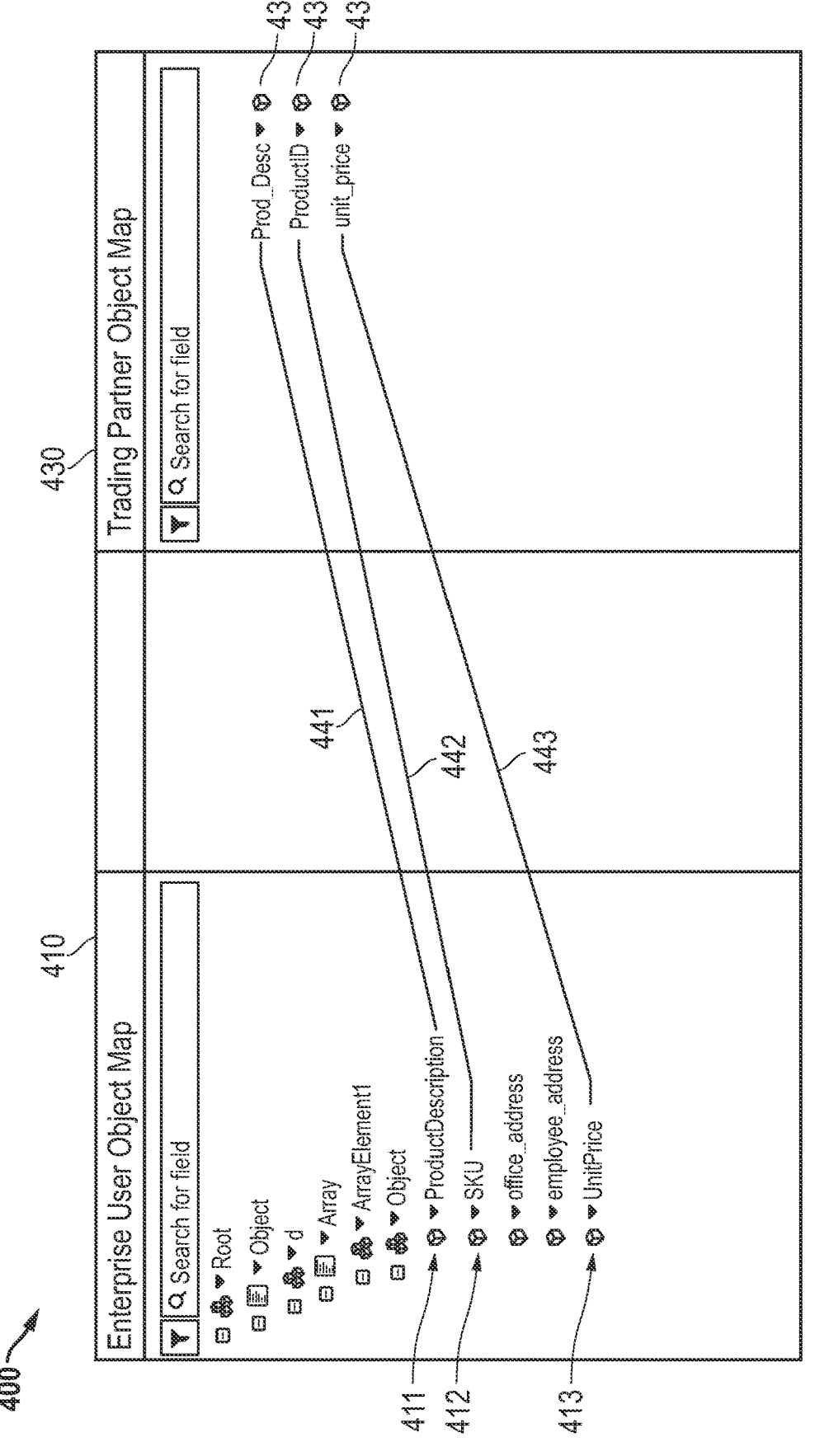
FIG. 4 is a graphical diagram illustrating data lineage mapping between multiple dataset field names between a first enterprise user and a common trading partner for an integration connectivity sales facilitation system according to an embodiment of the present disclosure.

FIG. 4 is a graphical diagram illustrating data lineage mapping between multiple dataset field names, each associated with a separate enterprise user for a single dataset field value throughout execution of integration process code instructions between a first enterprise user and a common trading partner according to an embodiment of the present disclosure. As described herein, because different applications or APIs participating in a set of end-to-end business integration process code instructions (e.g., such as the process visually modeled via GUI 300 in FIG. 3, above) may adhere to differing code languages and dataset formats, each of a plurality of code sets generated based on these user-generated connector visual elements may be written or generated in a different code set, and may identify dataset field values using different naming conventions, dataset formats, or storage structures. Thus, the code instructions for retrieving a given dataset field value from a first application or API may describe that dataset field value using a completely different dataset field name than the code instructions for transmitting the same dataset field value to a second application or API.

The integration application management system in an embodiment may trace or otherwise map dataset field values as they are accessed, copied, transferred, or otherwise manipulated during the transfer of such dataset field values within visually modeled business data integration process code instructions deployed to conduct an integration process. This may involve identifying which of these dataset field names was applied at each trading partner, application, or API involved in the business data integration process code instructions, and the manipulation or action performed by each of these trading partners, applications, or APIs during execution of the business data integration process code instructions. This mapping may be automatically generated and displayed via data lineage map graphical user interface (GUI) 400 by the integration application management system based upon analysis of the code instructions generated by the integration application management system to reflect the series of process-representing visual elements customized by a user to visually model that user's set of end-to-end business integration process code instructions in some embodiments, such as that described above with respect to FIG. 3. In other embodiments, this mapping may be performed by a user in whole or in part via the data lineage map GUI 400.

A data lineage map may be displayed in an embodiment via a data lineage map graphical user interface 400, which may correspond to the graphical user interfaces 300 described with reference to FIG. 3. A user may create, view, or edit a data lineage map in an embodiment that includes a first column 410 listing one or more dataset field names (e.g., 411, 412, 413) for dataset field values accessed, transmitted, copied, or otherwise manipulated by the enterprise user (e.g., the purchasing user or the selling user, both of which may have previously executed integration process code instructions with a common trading partner such as Amazon®), and a column 430 listing one or more dataset field names for dataset field values accessed, transmitted, copied, or otherwise manipulated by the common trading partner (e.g., Amazon®).

In some embodiments, a dataset field value manipulated by the enterprise user (e.g., purchasing user or selling user) at one step within execution of deployed business data integration process code instructions may also be manipulated by the common trading partner (e.g., Amazon®) at a later step within the same execution of deployed business data integration process code instructions. In other words, such deployed business data integration process code instructions in an embodiment may involve transmitting a dataset field value from the purchasing user or the selling user to the common trading partner (e.g., Amazon®). Thus, one or more of the dataset field names listed in column 410 may describe a dataset field value that is also described by one or more of the dataset field names listed in column 430. For example, deployed business data integration process code instructions may include transmitting a dataset field value that includes a product identification (e.g., stock keeping unit (SKU) specific to the purchasing user or the selling user), having a dataset field name "SKU" 412, locatable by the enterprise user (e.g., purchasing user or selling user), to the common trading partner (e.g., Amazon® or Amazon® API). Such deployed business data integration process code instructions may also involve storing the dataset field value that includes the product identification under a dataset field name "ProductID" 432, locatable by the common trading partner (e.g., Amazon® or Amazon® API). Thus, a single dataset field value that includes an identifying number or label for a product offered for sale may be given two separate dataset field names (e.g., "SKU" 412, and "ProductID" 432) at two separate points within the same deployed business data integration process code instructions. In such an embodiment, the data lineage map GUI 400 may associate the dataset field name "SKU" 412 from column 410 with the dataset field name "ProductID" 432 from column 430 using a mapping connector 442.

In another example embodiment, the data lineage map GUI 400 may associate the dataset field name "ProductDescription" 411 from column 410 with the dataset field name "Prod_Desc" 431 from column 430 using a mapping connector 441. In yet another example embodiment, the data lineage map GUI 400 may associate the dataset field name "UnitPrice" 413 from column 410 with the dataset field name "unit_price" 433 from column 430 using a mapping connector 443. Such a mapping between different dataset field names under which the same dataset field value may be stored as it is transmitted from an enterprise user (e.g., purchasing user or selling user) to a common trading partner (e.g., Amazon®) may be performed for any number of or all dataset field values transmitted during execution of given deployed business data integration process code instructions according to various embodiments described herein. In an embodiment in which the integration application manage- ment system automatically generates a data lineage map such as that shown in the data lineage map GUI 400, a separate link (e.g., 441, 442, or 443) may be made for each dataset field value transmitted during execution of the deployed business data integration process code instructions visually modeled via the process-representing visual ele- ments customized by the enterprise user (e.g., as described above with respect to FIG. 3). As such, in an example embodiment in which the enterprise user has visually mod- eled deployed business data integration process code instructions for the transmission of all dataset field values required to fill out a purchase order (e.g., purchase order dataset field values) according to the formatting require- ments of the common trading partner (e.g., Amazon® or Amazon® API), the automatically generated data lineage map for those deployed business data integration process code instructions may include a link mapping the different dataset field names under which each of the required pur- chase order dataset field values may be stored at the enter- prise user (e.g., selling user or purchasing user described in greater detail below with respect to FIGS. 5 and 6) or at the common trading partner (e.g., Amazon®). In such a way, the data lineage map in an embodiment may allow the integra- tion connectivity sales facilitation system to use each dataset field name given to a dataset field value throughout deployed business data integration process code instructions, use identification of which of these dataset field names was applied at each application/location/enterprise involved in the business data integration process code instructions, and determine the manipulation or action performed by each of these applications/locations/enterprises during the execution of the deployed business data integration process code instructions to merge with another set of business data integration process instructions for another user having a common trading partner to automatically generate code instructions of a new, merged business data integration process for conducting sales integration among the new users.

Figure 5:
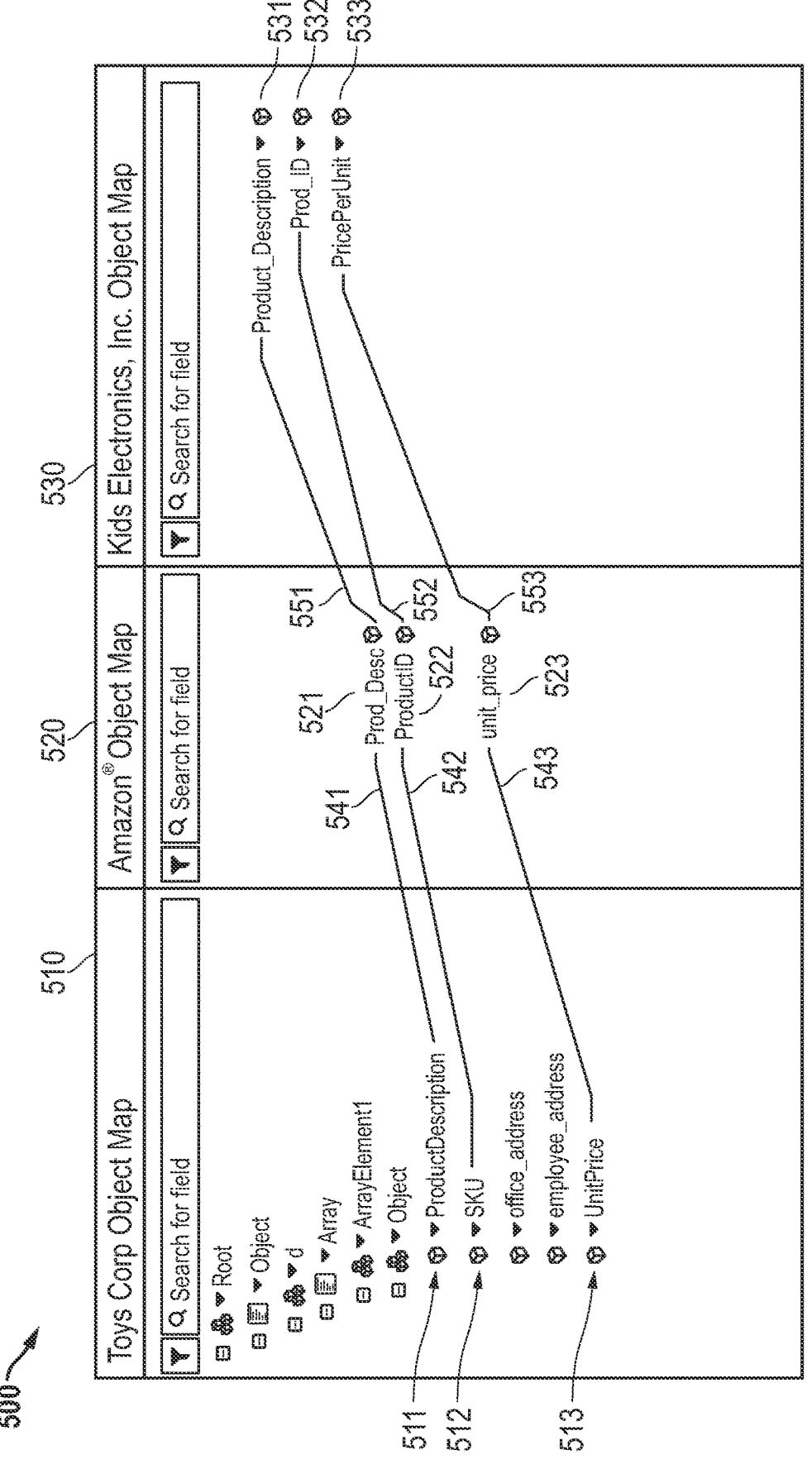
FIG. 5 is a graphical diagram illustrating a merged data lineage mapping between multiple dataset field names for an integration connectivity sales facilitation system according to an embodiment of the present disclosure.

FIG. 5 is a graphical diagram illustrating a merged data lineage mapping between multiple dataset field names, each associated with a separate enterprise user for a single dataset field value throughout deployed business data integration process code instructions between a first enterprise user and a second enterprise user sharing a common trading partner according to an embodiment of the present disclosure. As described herein, many users of a visual integration model- ing system such as included with the Boomi® platform may have visually modeled previously executed deployed busi- ness data integration process code instructions for the trans- fer of dataset field values to various trading partners, or to track or map the ways in which such dataset field values have been accessed, manipulated, reformatted, or transmit- ted for storage at the trading partner storage location, as described in greater detail above with respect to FIG. 4. In many cases, a plurality of users who have not previously connected or exchanged data with one another may have a shared or common trading partner with whom both users have performed these previously executed data integration processes. For example, many users have executed previous deployed business data integration process code instructions with large online retailers such as Amazon®, or Walmart®. In order to execute such deployed business data integration process code instructions with such a large retailer (e.g., Amazon®), several enterprise users may have mapped the ways in which those users' dataset field values, such as dataset field values required to fill out a purchase order or invoice to facilitate sales of products through the Amazon® online store have been reformatted, renamed, or manipulated to meet the formatting requirements for the Amazon® API controlling such purchasing processes with the deployed business data integration process code instructions. Such a mapping process may also provide an identification of one or more of a user's dataset field values, identified by that user's dataset field name that are required to facilitate online sales between trading partners, including the Amazon® online store.

For example, the data lineage map displayed via GUI 400 as described above with respect to FIG. 4 may map such dataset field value manipulations for a first set of common partner deployed business data integration process code instructions between a first enterprise user (e.g., purchasing user) and a common trading partner (e.g., Amazon®), or may map such manipulations for a second set of common partner deployed business data integration process code instructions between a second enterprise user (e.g., selling user) and the same common trading partner (e.g., Ama- zon®). A plurality of these maps for a plurality of users having a common trading partner (e.g., Boomi® users trading with Amazon®) may be streamlined into a single merged data lineage map, as shown in FIG. 5, linking a first Amazon® trading partner dataset field name to a second Amazon® trading partner dataset field name, without any participation or involvement of these previously uncon- nected users, based solely on each of those trading partners' individual data lineage maps (e.g., as described above with respect to FIG. 4) to the common Amazon® API format from the separate first and second or other common trading partner deployed business data integration process code instructions. For example, such a merged data lineage map may include a first column 510 listing one or more dataset field names (e.g., 511, 512, 513) for dataset field values maintained by a first enterprise user (e.g., "Toys Corp."), and a column 520 listing one or more dataset field names for dataset field values accessed, transmitted, copied, or other- wise manipulated by a common trading partner (e.g., Ama- zon®). The merged data lineage map may also include a third column 530 listing one or more dataset field names (e.g., 531, 532, 533) for dataset field values maintained by a second enterprise user (e.g., "Kids Electronics, Inc.") accessed, transmitted, copied, or otherwise manipulated by the same common trading partner (e.g., Amazon®).

In an embodiment, two enterprise users (e.g., "Toys Corp." and "Kids Electronics, Inc.") may have both previ- ously executed deployed business data integration process code instructions for the transmissions of dataset field values used in a purchasing order or sales invoice formatted accord- ing to the Amazon® API requirements, for example. The integration connectivity sales facilitation system in an embodiment may automatically generate the merged data lineage map shown at FIG. 5, based on a first data lineage map describing a first set of common trading partner deployed business data integration process code instructions between "Toys Corp." and Amazon®, and on a second data lineage map describing a second set of common trading partner deployed business data integration process code instructions between "Kids Electronics, Inc." and Ama- zon®. In the case where "Toys Corp." later requests con- nectivity to "Kids Electronics, Inc." for the transfer of purchase order dataset field values pursuant to submission of a purchase order (e.g., as described in greater detail below with respect to FIGS. 6, 7, and 8, below), "Toys Corp." may be referred to as a "purchasing user," and "Kids Electronics, Inc." may be referred to a "selling user." Further, in such a scenario, the first data lineage map describing the first set of common trading partner deployed business data integration process code instructions between "Toys Corp." and Amazon® may be referred to as the purchasing user data lineage map. Similarly, in such a scenario, the second data lineage map describing the second set of common trading partner deployed business data integration process code instructions between "Kids Electronics, Inc." and Amazon® may be referred to as the selling user data lineage map.

The integration connectivity sales facilitation system in an embodiment may automatically generate the merged data lineage map shown at FIG. 5, based on the purchasing user data lineage map and the selling user data lineage map. For example, the data lineage map GUI 500 may associate the dataset field name "SKU" 512 from column 510 with the dataset field name "ProductID" 522 from column 520 using a mapping connector 542, and may associate the dataset field name "ProductID" 522 from column 520 with the dataset field name "Prod_ID" 532 from column 530 using a mapping connector 552. By following the mapping connectors 542 and 552 in such an example embodiment, the integration connectivity sales facilitation system may identify that the dataset field value stored by "Toys Corp." under the dataset field name "SKU" may be transmitted to "Kids Electronics Inc." for storage under the dataset field name "Prod_ID" for processing of a purchasing order from "Toys Corp." by "Kids Electronics Inc."

As another example, the data lineage map GUI 500 may associate the dataset field name "ProductDescription" 511 from column 510 with the dataset field name "Prod_Desc" 521 from column 520 using a mapping connector 541, and may associate the dataset field name "Prod_Desc" 521 from column 520 with the dataset field name "Product_Description" 531 from column 530 using a mapping connector 551. By following the mapping connectors 541 and 551 in such an example embodiment, the integration connectivity sales facilitation system may identify that the dataset field value stored by "Toys Corp." under the dataset field name "ProductDescription" may be transmitted to "Kids Electronics Inc." for storage under the dataset field name "Product_Description" for processing of a purchasing order from "Toys Corp." by "Kids Electronics Inc."

In still another example, the data lineage map GUI 500 may associate the dataset field name "UnitPrice" 513 from column 510 with the dataset field name "unit_price" 523 from column 520 using a mapping connector 543, and may associate the dataset field name "unit_price" 523 from column 520 with the dataset field name "PricePerUnit" 533 from column 530 using a mapping connector 553. By following the mapping connectors 543 and 553 in such an example embodiment, the integration connectivity sales facilitation system may identify that the dataset field value stored by "Toys Corp." under the dataset field name "Unit-Price" may be transmitted to "Kids Electronics Inc." for storage under the dataset field name "PricePerUnit" for processing of a purchasing order from "Toys Corp." by "Kids Electronics Inc."

Such a mapping between different dataset field names under which the same dataset field value may be stored as it is transmitted among multiple enterprise user (e.g., purchasing user or selling user) sharing a common trading partner (e.g., Amazon®) may be determined for any number of or all dataset field values transmitted during execution of given deployed business data integration process code instructions according to various embodiments described herein. For example, a separate link (e.g., 541, 542, 543, 551, 552, or 553) may be made for each dataset field value transmitted during deployed business data integration process code instructions for the transmission of all dataset field values required to fill out a purchase order (e.g., purchase order dataset field values) according to the formatting requirements of the common trading partner (e.g., Amazon® or Amazon® API). In such an embodiment, the automatically generated data lineage map for those deployed business data integration process code instructions may include a link mapping the different dataset field names under which each of the required purchase order dataset field values may be stored at the selling user (e.g., "Kids Electronics, Inc.").

Figure 6A:
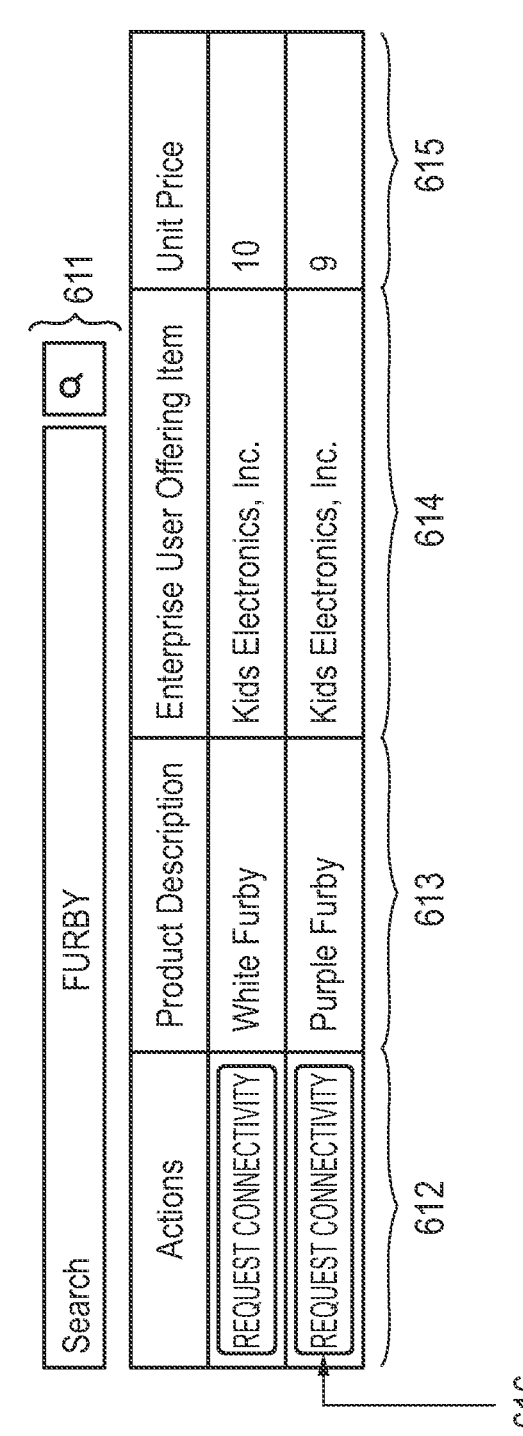
FIG. 6A is a graphical diagram illustrating a sales connectivity graphical user interface (GUI) for requesting connectivity using the integration connectivity sales facilitation system according to an embodiment of the present disclosure.

FIG. 6A is a graphical diagram illustrating a sales connectivity graphical user interface (GUI) for requesting connectivity between a purchasing integration process user and a selling integration process user for the purchase of a searched product according to an embodiment of the present disclosure. As described herein, the integration connectivity sales facilitation system of the integration application management system code instructions of embodiments herein may allow participating integration process users (e.g., purchasing user) to search inventory of other participating integration process users (e.g., selling user) for particular products offered for sale. For example, integration process user "Toys Corp." may use the search bar 611 of the sales connectivity GUI 610 to search for specific products such as a Furby offered for sale from other existing integration process user "Kids Electronics, Inc." with whom "Toys Corp." has not yet engaged in a previous data integration process. The sales connectivity GUI 610 may then display a column 612 for requesting of connection to the enterprise user offering a searched item (e.g., "Kids Electronics, Inc."), a column 613 displaying a description of products matching the search term (e.g., "furby"), a column 614 displaying the selling user (e.g., "Kids Electronics, Inc.") offering the searched item for sale, and a column 615 describing the price per unit offered for sale. This may be drawn from a merged data lineage map from previously deployed business data integration process code instructions of the purchasing user and the selling user with the common trading partner enterprise. In other embodiments other columns may be included for describing other dataset field values or dataset field names required as part of a purchase order, or other information necessary for purchasing decisions, such as transportation costs, shipping addresses, units available for purchase, etc. In an example embodiment, "Toys Corp." may use GUI 610 to search for "furby" via the search bar 611, and identify that "Kids Electronics, Inc." is offering purple furbies for sale at $9 per unit. If "Toys Corp." decides to attempt the purchase of such purple furbies from "Kids Electronics, Inc" at the price of $9 per unit, the "Toys Corp." user may select button 616 to request connectivity with "Kids Electronics, Inc." for the purchase of the purple furby at the listed price.

FIG. 6B is a graphical diagram illustrating a sales connectivity graphical user interface (GUI) for accepting a request for connectivity between a purchasing integration process user and a selling integration process user for the purchase of a searched product according to an embodiment of the present disclosure. Upon receiving a request from "Toys Corp." to connect with "Kids Electronics, Inc." in an example embodiment, the integration connectivity sales facilitation system may prompt "Kids Electronics, Inc." to approve such connectivity via the sales connectivity GUI 620 made visible to "Kids Electronics, Inc." In other words, the GUI 610 described above with respect to FIG. 6A may be visible to a purchasing user, while the GUI 620 described with respect to FIG. 6B may be visible to a selling user. GUI 620 may include a column 621 identifying the purchasing user requesting connectivity (e.g., "Toys Corp."), a column 623 describing the product requested for purchase (e.g., purple furby), a column 624 identifying a number of units requested (e.g., one), column 625 displaying the agreed-upon price per unit (e.g., $9) and column 626 for use in approving or disapproving the requested connection. In other embodiments, the GUI 620 may also include other information useful to the selling user (e.g., "Kids Electronics, Inc.") to determine whether to accept the requested connection, such as a crowd-sourced scoring or rating shown in column 622 describing case of business transactions between the purchasing user ("Toys Corp.") and previous business partners of the purchasing user.

The selling user (e.g., "Kids Electronics, Inc.") in an embodiment may select button 627 to approve the requested connection with "Toys Corp." for the receipt of purchase order dataset field values required for a purchase order to facilitate purchase of the purple furby from "Kids Electronics, Inc.," for example. In such an embodiment, the integration connectivity sales facilitation system may automatically generate code instructions for a business data integration process, or at least an easily customizable framework visual modeled flow diagram for transmitting any purchasing order dataset field values required for the purchase of those products among the previously unconnected purchasing user (e.g., "Toys Corp.") and selling user (e.g., "Kids Electronics, Inc."), as described in greater detail below with respect to FIGS. 7 and 8. The integration connectivity sales facilitation system in an embodiment may automatically generate connector code instructions of a purchase order business data integration process for transferring and renaming any dataset field values required for such a purchase order to a storage location managed by the selling user in whatever format is required by the selling user, based on the purchasing user data lineage map and selling user data lineage map or merged and described above with respect to FIGS. 4 and 5.

FIG. 7 is a flow diagram illustrating a method of facilitating connection between a purchasing integration process-modeling user and a selling integration process-modeling user who have a common trading partner for exchange of purchase order dataset field values necessary for submission of a purchasing order according to an embodiment of the present disclosure. As described herein, the integration connectivity sales facilitation system in an embodiment may allow participating integration process users (e.g., purchasing user) to search inventory of other participating integration process users (e.g., selling user) for particular products offered for sale, and allow purchasing users to request connectivity with the selling user for the purchase of desired products based on previously-deployed visually modeled business data integration process code instructions and merged data lineage mapping.

At block 702, a plurality of users having one or more common trading partners may identify product sales datasets describing products to offer for sale via a sales connectivity graphical user interface (GUI), by purchase order dataset field name given in each enterprise user's formatting. As described herein, two enterprise users (e.g., "Toys Corp." and "Kids Electronics, Inc.") may have both previously executed deployed business data integration process code instructions for the transmissions of dataset field values used in a purchasing order or sales invoice formatted according to the Amazon® API requirements or another common trading partner, for example. In such an example embodiment, "Kids Electronics, Inc." may identify one or more dataset field values that may be shared with other enterprise users (e.g., "Toys Corp.") via the sales facilitation GUI (e.g., as described above with respect to FIG. 6A) to encourage purchase of products offered for sale by "Kids Electronics, Inc." from other enterprise users with whom "Kids Electronics, Inc." has not yet established a business relationship. More specifically, "Kids Electronics, Inc." may allow the integration connectivity sales facilitation system to query, retrieve, and display purchase order dataset field values from a merged data lineage map describing products offered by "Kids Electronics, Inc." for sale, such as dataset field values having a dataset field name "Product_Description" describing various items for sale, dataset field values having a dataset field name "Prod_ID" identifying various items for sale (e.g., by serial number or SKU), or dataset field values having a dataset field name "PricePerUnit" describing sales prices for various items for sale.

A purchasing user of the integration connectivity sales facilitation system in an embodiment may search for other users offering specific products for sale via a sales connectivity graphical user interface (GUI) at block 704 via one or merged data lineage maps. For example, in an embodiment described with respect to FIG. 6A, the purchasing user "Toys Corp." may use the search bar 611 of the sales connectivity GUI 610 to search for other enterprise users who are offering furbies for sale.

At block 706, the integration connectivity sales facilitation system in an embodiment may query databases or APIs for a plurality of participating users to identify selling users offering the product for which the purchasing user has performed the above search. For example, the integration connectivity sales facilitation system in an embodiment may query and retrieve from participating users all purchase order dataset field values via one or merged data lineage maps identified at block 702 by participating selling users that may be needed to facilitate sales of various stock items. More specifically, the integration connectivity sales facilitation system in an embodiment may retrieve all purchase order dataset field values identified by the selling user "Kids Electronics, Inc." at block 702 associated with a dataset field name that includes the word "Furby," as searched by the purchasing user, "Toys Corp." at block 704.

The sales connectivity GUI in an embodiment may display identification of the selling user, description of specific product for sale, and offered unit price to the purchasing user at block 708 or determined from the merged data lineage maps. For example, in an embodiment described with respect to FIG. 6A, the sales connectivity GUI 610 may display a column 612 for requesting of connection to the enterprise user offering a searched item (e.g., "Kids Electronics, Inc."), a column 613 displaying a description of products matching the search term (e.g., "furby"), a column 614 displaying the selling user (e.g., "Kids Electronics, Inc.") offering the searched item for sale, and a column 615 describing the price per unit offered for sale. The sales connectivity GUI in such an embodiment may further display any other purchase order dataset field values identified by the selling user at block 702 as permissible for sharing with potential purchasing users via the merged dataset lineage map derived from plural visually modeled business data integration process code instructions with the common trading partner.

At block 710, the purchasing user in an embodiment may request connectivity to the selling user via the sales connectivity GUI to facilitate exchange of purchase order datasets for specific product offered for sale between the purchasing user and the selling user. For example, in an embodiment, "Toys Corp." may use GUI 610 to search for "furby" via the search bar 611, and identify that "Kids Electronics, Inc." is offering purple furbies for sale at $9 per unit. If "Toys Corp." decides to attempt the purchase of such purple furbies from "Kids Electronics, Inc" at the price of $9 per unit, the "Toys Corp." user may select button 616 to request connectivity with "Kids Electronics, Inc." for the purchase of the purple furby at the listed price.

The integration connectivity sales facilitation system in an embodiment at block 712 may determine whether the selling user has accepted the request from the purchasing user to connect. For example, in an embodiment described with respect to FIG. 6B, upon receiving a request from "Toys Corp." to connect with "Kids Electronics, Inc." (e.g., as described at block 710), the integration connectivity sales facilitation system may prompt "Kids Electronics, Inc." to approve such connectivity via the sales connectivity GUI 620 made visible to "Kids Electronics, Inc." The selling user (e.g., "Kids Electronics, Inc.") in an embodiment may select button 627 to approve the requested connection with "Toys Corp." for the receipt of purchase order dataset field values required for a purchase order to facilitate purchase of the purple furby from "Kids Electronics, Inc.," for example. If the selling user accepts connectivity, as requested, the method may proceed to block 714 for automatic generation of connector code sets for an integration process to transfer purchase order datasets required for a purchase order from the purchasing user to the selling user by the previously deployed business data integration connectivity sales facilitation system with the common trading partner and a merged dataset lineage map derived therefrom. If the selling user does not accept connectivity, the method may proceed to block 716 to notify the purchasing user that the request has been rejected.

At block 714, in an embodiment in which the selling user has accepted connectivity, the sales connectivity GUI may notify the integration connectivity sales facilitation system of the accepted request to automatically generate a code set to connect during execution of purchase order data business data integration process code instructions for transmission of purchase order datasets from the purchasing user storage location to the selling user storage location, as required for the purchasing user to purchase the product from the selling user. As described in greater detail with respect to FIG. 8 below, the integration connectivity sales facilitation system in such an embodiment may automatically generate connector code instructions for such purchase order data business data integration process code instructions without any further input from either the purchasing user, or the selling user in one embodiment. In other embodiments, the integration connectivity sales facilitation system may automatically generate an easily customizable purchasing order integration process flow diagram for a framework to customize via a visual integration modeling system for deployment. Such connector code sets may be generated based on code sets describing previously executed, but separate integration process code instructions between the purchasing user and a common trading partner, and between the selling user and the common trading partner, respectively and visually modeled via the visual integration modeling system. In such embodiments, such code sets may further be generated based on the merged data lineage maps describing such previously executed but separate integration processes and correlation between the same.

FIG. 8 is a flow diagram illustrating a method of automatically generating connector code sets for purchase order data integration process code instructions between a purchasing integration process-modeling user and a selling integration process-modeling user who have a common trading partner for exchange of purchase order dataset field values necessary for submission of a purchasing order based on previously-deployed, visually modeled business data integration process code instructions according to an embodiment of the present disclosure. As described herein, upon agreement or approval of a purchasing user's request for connectivity by the selling user, the integration connectivity sales facilitation system in embodiments herein may automatically generate connector code instructions of purchase order data integration process code instructions for transferring and renaming any dataset field values required for such a purchase order to a storage location managed by the selling user in whatever format is required by the selling user. In some cases, this may be done based on the lineage maps described above with respect to FIGS. 4 and 5.

The integration connectivity sales facilitation system in an embodiment may refer to previously executed connector code sets customized by the purchasing user and the selling user with a visual integration modeling system for data exchanges between each of those users, respectively, and a common trading partner with whom they both do business. For example, the integration connectivity sales facilitation system in an example embodiment may automatically generate connector code sets for a data exchange integration process between "Toys Corp." and "Kids Electronics, Inc." based on a first previously executed integration visually modeled by "Toys Corp." between "Toys Corp." and Amazon®, and on a second previously executed integration visually modeled by "Kids Electronics, Inc." between "Kids Electronics Inc." and Amazon® using the visual integration modeling system of the integration application management system of embodiments herein. In such an embodiment, the integration connectivity sales facilitation system may generate the connector code sets or an easily-customizable framework visual model integration process flow diagram for a direct integration process between "Toys Corp." and "Kids Electronics, Inc." without either of those users needing to fully model this direct exchange or map any data format changes required.

At block 802, the purchasing user in an embodiment may visually model a first set of common trading partner integration process code instructions for transfer of a purchase order dataset field value having a purchase order dataset field name in a first data format for storage in a common trading partner data format at a common trading partner storage location. For example, in a first embodiment described with respect to FIG. 3, the series of process-representing visual elements may represent a first set of end to end common partner business integration process code instructions between the purchasing enterprise user (e.g., 214 of FIG. 2) and the common trading partner (e.g., 208 of FIG. 2) for transferring and renaming a purchase order dataset field value stored at the purchasing user storage location (e.g., 214 of FIG. 2) under a first dataset field name in a first data format to a common trading partner storage location (e.g., 208 of FIG. 2) identified by a common trading partner dataset field name in a common trading partner data format. In such a first embodiment, the start element 302 may include purchasing user-specified information identifying one or more purchasing order dataset field values according to a purchasing order dataset field name given in a first data format defined by the purchasing user (e.g., 214).

The connector element 308 in such a first embodiment may include common trading partner-specified information identifying a common trading partner dataset field name given in a common trading partner data format (e.g., data format required by the Amazon® API) under which the transferred purchase order dataset field value transmitted from the first enterprise user (e.g., 214) may be stored at the common trading partner (e.g., 208).

For example, "Toys Corp." may visually model a first set of common trading partner integration process code instructions for the transfer of purchase order dataset field values having purchase order dataset field names in a first data format defined by "Toys Corp." for storage or processing by Amazon® or the Amazon® API in the data format required by Amazon® or the Amazon® API in an integration process flow modeling GUI as part of the visual integration modeling system of embodiments herein. As described herein, purchase order dataset field values may include any information required to fill out or facilitate a purchase order through the common trading partner (e.g., Amazon®) as stored and accessible by the code set of the visually modeled business data integration process with the first common trading partner. For example, purchase order dataset field values may include product descriptions, product identifiers, price per unit, shipping address, or purchaser or seller identification. In some embodiments, these may include information required for sales invoices or receipts that may be processed by Amazon®, as well.

In a specific example, "Toys Corp." may visually model a first set of common trading partner integration process code instructions for the transfer of a product description having a purchase order dataset field name "ProductDescription" for storage and processing by Amazon® under a dataset field name "Prod_Desc." As another example, "Toys Corp." may visually model a first set of common trading partner integration process code instructions for the transfer of a product identification having a purchase order dataset field name "SKU" for storage and processing by Amazon® under a dataset field name "ProductID." In still another example, "Toys Corp." may visually model a first set of common trading partner integration process code instructions for the transfer of a unit price having a purchase order dataset field name "UnitPrice" for storage and processing by Amazon® under a dataset field name "unit_price."

In an embodiment, "Toys Corp." may perform this step using the integration process modeling GUI described above with respect to FIG. 3 as part of the visual integration modeling system of the integration application management system provided by a service provider such as Boom®. For example, "Toys Corp." may enter one or more purchase order dataset field names (e.g., "SKU") for a purchase order dataset field value to be retrieved from storage maintained by "Toys Corp." at a start element 302 of a visual flow diagram in an embodiment. The integration application management system in an embodiment may generate a start code set for retrieving the purchase order dataset field value matching the entered purchase order dataset field name (e.g., "SKU") from storage maintained by "Toys Corp." As described herein, the integration application management system in an embodiment may associate each of the plurality of visual elements selected by the user for inclusion within the integration process code instructions visually modeled by the visual flow diagram with executable code instructions. Each set of connector code instructions in an embodiment may include code instructions executable to perform an action on a purchase order dataset field value (e.g., the dataset field value associated with the user-specified purchase order set field name). These code sets may be written or generated in any programming code language.

"Toys Corp." may also enter, for a second visual connector element icon in the visual flow diagram, a first common trading partner dataset field name under which to store the purchase order dataset field value at a storage location maintained by a common trading partner (e.g., Amazon®). For example, the user may insert a connector element 308 icon within the same process flow diagram that includes start element 302 for submission of a purchase order to Amazon® via the integration process modeling GUI. The user may insert connector element 308 icon to represent associated code instructions for transmitting the purchase order dataset field value retrieved at element 302 to a storage location maintained by Amazon® or to the Amazon® API. For example, the user may insert this connector element 308 icon for a code set transmitting the purchase order dataset field value having the purchase order dataset field name "SKU," as retrieved at element 302 from a "Toys Corp." storage location, and for storing it with a common trading partner dataset field name "ProductID" in a location maintained by Amazon®, according to formatting requirements set by Amazon®.

The integration application management system in an embodiment may generate a connector code set for storing the purchase order dataset field value at the common trading partner (e.g., Amazon®) under the common trading partner dataset field name based on the visually modeled business data integration flow diagram. The integration application management system in an embodiment may associate the connector visual element 308 with code instructions executable to perform an action (e.g., store) on a purchase order dataset field value. As described herein, these code sets may be written or generated in any programming code language. Thus, the process-representing elements in an embodiment may be programming language-agnostic. Using such process-representing elements in an embodiment, a user may visually model a set of end-to-end integration process code instructions between multiple applications that each use different naming conventions and storage structures for storage of dataset field values.

A purchasing user data lineage map may be generated at block 804 by the integration application management system code instructions to identify a common trading partner dataset field name under which a purchase order dataset field value may be stored by a common trading partner according to a common trading partner data format in an embodiment. In some embodiments, such a purchasing user data lineage map may be automatically generated by the integration connectivity sales facilitation system of the integration application management system code instructions based on the connector code sets generated at block 802. In other embodiments, the purchasing user may generate such a purchasing user data lineage map, in part, via the data lineage map GUI, as described with respect to FIG. 4, for example.

A user may create, view, or edit a data lineage map in an embodiment by linking one or more purchase order dataset field names (e.g., 411, 412, 413) for purchase order dataset field values accessed, transmitted, copied, or otherwise manipulated by the enterprise user (e.g., the purchasing user or the selling user, both of which may have previously executed integration process code instructions with a common trading partner such as Amazon®) to one or more common trading partner dataset field names for purchase order dataset field values accessed, transmitted, copied, or otherwise manipulated by the common trading partner (e.g., Amazon®) during execution of a deployed business data integration process code set. For example, "Toys Corp.," via the integration application management system in an embodiment, may link a purchase order dataset field value that includes a product identification (e.g., stock keeping unit (SKU) specific to the purchasing user or the selling user), having a purchase order dataset field name "SKU" 412 maintained by "Toys Corp.," to the common trading partner (e.g., Amazon® or Amazon® API).

At block 806, the selling user in an embodiment may visually model a second set of common trading partner integration process code instructions for transfer of a purchase order dataset field value having a purchase order dataset field name in a second data format for storage in a common trading partner data format at a common trading partner storage location via the visual integration modeling system of the integration application management system code instructions. For example, in a second embodiment described with respect to FIG. 3, the series of process-representing visual elements shown in FIG. 3 may represent a second set of end to end common partner business integration process code instructions between the selling enterprise user (e.g., 210) and the common trading partner (e.g., 208) for transferring and renaming a purchase order dataset field value stored at the selling user storage location (e.g., 210 of FIG. 2) under a second dataset field name in a second data format to a common trading partner storage location (e.g., 208 of FIG. 2) identified by a common trading partner dataset field name in a common trading partner data format. In such a second embodiment, the start element 302 may include selling user-specified information identifying one or more purchasing order dataset field values according to a purchasing order dataset field name given in a second data format defined by the selling user (e.g., 210). The connector element 308 in such a second embodiment may include common trading partner-specified information identifying a common trading partner dataset field name given in a common trading partner data format (e.g., data format required by the Amazon® API) under which the transferred purchase order dataset field value transmitted from the second enterprise user (e.g., 210) may be stored at the common trading partner (e.g., 208).

For example, "Kids Electronics, Inc." may visually model a second set of common trading partner integration process code instructions for the transfer of purchase order dataset field values having purchase order dataset field names in a second data format defined by "Kids Electronics, Inc." for storage or processing by Amazon® or the Amazon® API in the data format required by Amazon® or the Amazon® API.

In a specific example, "Kids Electronics, Inc." may visually model a second set of common trading partner integration process code instructions for the transfer of a product description having a purchase order dataset field name "Product_Description" for storage and processing by Amazon® under a dataset field name "Prod_Desc." As another example, "Kids Electronics, Inc." may visually model a second set of common trading partner integration process code instructions for the transfer of a product identification having a purchase order dataset field name "Prod_ID" for storage and processing by Amazon® under a dataset field name "ProductID." In still another example, "Kids Electronics, Inc." may visually model a second set of common trading partner integration process code instructions for the transfer of a unit price having a purchase order dataset field name "PricePerUnit" for storage and processing by Amazon® under a dataset field name "unit_price."

In an embodiment, "Kids Electronics, Inc." may perform this visual modeling step using the integration process modeling GUI of the visual integration modeling system described above with respect to FIG. 3. For example, "Kids Electronics, Inc." may enter one or more purchase order dataset field names (e.g., "Prod_ID") for a purchase order dataset field value to be retrieved from storage maintained by "Kids Electronics, Inc." via code instructions associated with a start element 302 of a visual flow diagram in an embodiment. The integration application management system in an embodiment may generate the start code set for retrieving the purchase order dataset field value matching the entered purchase order dataset field name (e.g., "Prod_ID") from storage maintained by "Kids Electronics, Inc." In an embodiment, "Kids Electronics, Inc." may also enter, within a second connector element, a common trading partner dataset field name under which the associated code instructions with the second connector element will store the purchase order dataset field value at a storage location maintained by a common trading partner (e.g., Amazon®). For example, the user may insert a connector element 308 within the same integration process flow diagram that includes start element 302 representing code instructions customized for submission of a purchase order to Amazon®. The user may insert connector element 308 to represent those code instructions for transmitting the purchase order dataset field value retrieved at element 302 to a storage location maintained by Amazon® or to the Amazon® API. For example, the user may insert connector element 308 for transmitting the purchase order dataset field value having the purchase order dataset field name "Prod_ID," as retrieved at element 302 from a "Kids Electronics, Inc." storage location, and for storing it with a common trading partner dataset field name "ProductID" in a location maintained by Amazon®, according to formatting requirements set by Amazon®. The integration application management system in an embodiment may generate a connector code set for storing the purchase order dataset field value at the common trading partner (e.g., Amazon®) under the common trading partner dataset field name via the visual modeling with the visual integration modeling system and access to a library of modifiable code sets for the element icons customized in the integration process flow diagram. The integration application management system in an embodiment may associate the connector visual element 308 with code instructions from such available libraries and executable to perform an action (e.g., store) on a purchase order dataset field value.

A selling user data lineage map may be generated at block 808 to identify a common trading partner dataset field name under which a purchase order dataset field value may be stored by a common trading partner according to a common trading partner data format in an embodiment. In some embodiments, such a selling user data lineage map may be automatically generated by the integration connectivity sales facilitation system of the integration application management system code instructions based on the connector code sets generated at block 806. In other embodiments, the selling user may generate such a selling user data lineage map in part via the data lineage map GUI. For example, "Kids Electronics, Inc." or the integration application management system in an embodiment may link a purchase order dataset field value that includes a product identification having a purchase order dataset field name "Prod_ID" maintained by "Kids Electronics, Inc." to the common trading partner (e.g., Amazon® or Amazon® API).

At block 810, the integration connectivity sales facilitation system in an embodiment may receive a notification that the selling user has accepted a request to connect with the purchasing user for execution of purchase order data integration process code instructions between purchasing and selling users. For example, as described in greater detail above with respect to block 714 of FIG. 7, in an embodiment in which the selling user has accepted connectivity, the sales connectivity GUI may notify the integration connectivity sales facilitation system of the accepted request to connect for execution of purchase order data integration process code instructions for transmission of purchase order datasets from the purchasing user storage location to the selling user storage location, as required for the purchasing user to purchase the product from the selling user.

The integration connectivity sales facilitation system in an embodiment may identify at block 812 a second dataset field name under which a purchase order dataset field value will be stored at the selling user storage location to process a purchase order for the product selected by the purchasing user, based on the purchasing user data lineage map and the selling user data lineage map. For example, the purchasing user data lineage map generated at block 804 and the selling user data lineage map generated at block 808 may be streamlined into a single merged data lineage map in some embodiments, as shown in FIG. 5, linking a purchase order dataset field name defined by "Toys Corp." to a second dataset field name defined by "Kids, Electronics, Inc.," without any participation or with limited involvement of these previously unconnected users, based solely on each of those trading partners' data lineage maps (e.g., as described above with respect to blocks 804 and 808) or the merged data lineage map to the common Amazon® API format. For example, the data lineage map GUI 500 may visually represent an association made by the integration application management system between the dataset field name "SKU" 512 from column 510 and the dataset field name "ProductID" 522 from column 520 using a mapping connector 542, and may visually represent an association between the dataset field name "ProductID" 522 from column 520 and the dataset field name "Prod_ID" 532 from column 530 using a mapping connector 552. By following the mapping connectors 542 and 552 in such an example embodiment, the integration connectivity sales facilitation system may identify that the dataset field value stored by "Toys Corp." under the dataset field name "SKU" may be transmitted to "Kids Electronics Inc." for storage under the dataset field name "Prod_ID" for processing of a purchasing order from "Toys Corp." by "Kids Electronics Inc." via the merged data lineage map.

As another example, the data lineage map GUI 500 may visually represent an association between the dataset field name "ProductDescription" 511 from column 510 and the dataset field name "Prod_Desc" 521 from column 520 using a mapping connector 541, and may visually represent an association between the dataset field name "Prod_Desc" 521 from column 520 and the dataset field name "Product_Description" 531 from column 530 using a mapping connector 551. By following the mapping connectors 541 and 551 in such an example embodiment, the integration connectivity sales facilitation system may identify via the merged data lineage map that the dataset field value stored by "Toys Corp." under the dataset field name "ProductDescription" may be transmitted to "Kids Electronics Inc." for storage under the dataset field name "Product_Description" for processing of a purchasing order from "Toys Corp." by "Kids Electronics Inc."

In still another example, the data lineage map GUI 500 may visually represent an association between the dataset field name "UnitPrice" 513 from column 510 and the dataset field name "unit_price" 523 from column 520 using a mapping connector 543, and may visually represent an association between the dataset field name "unit_price" 523 from column 520 and the dataset field name "PricePerUnit" 533 from column 530 using a mapping connector 553. By following the mapping connectors 543 and 553 in such an example embodiment, the integration connectivity sales facilitation system may identify via the merged data lineage map that the dataset field value stored by "Toys Corp." under the dataset field name "UnitPrice" may be transmitted to "Kids Electronics Inc." for storage under the dataset field name "PricePerUnit" for processing of a purchasing order from "Toys Corp." by "Kids Electronics Inc."

Such a mapping between different dataset field names under which the same dataset field value may be stored as it is transmitted among multiple enterprise user (e.g., purchasing user or selling user) sharing a common trading partner (e.g., Amazon®) may be performed for any number of or all dataset field values transmitted during execution of given deployed business data integration process code instructions according to various embodiments described herein. For example, a separate link (e.g., 541, 542, 543, 551, 552, or 553) may be made for each dataset field value transmitted during execution of integration process code instructions for the transmission of all dataset field values required to fill out a purchase order (e.g., purchase order dataset field values) according to the formatting requirements of the common trading partner (e.g., Amazon® or Amazon® API). In such an embodiment, the automatically generated data lineage map for those deployed business data integration process code instructions may include a link mapping the different dataset field names under which each of the required purchase order dataset field values may be stored at the selling user (e.g., "Kids Electronics, Inc.").

At block 814, the integration connectivity sales facilitation system may automatically generate connector code sets of purchase order data integration process code instructions for transferring and renaming the purchase order dataset field value to the selling user storage location in the second data format in an embodiment. For example, in a third embodiment described with respect to FIG. 3, upon agreement by both the purchasing user (e.g., 214 of FIG. 2) and the selling user (e.g., 210 of FIG. 2) to transact business with one another, the integration connectivity sales facilitation system in an embodiment may automatically generate a third series of process-representing visual elements representing connector code instructions of purchase order data integration process code instructions for transferring and renaming the purchase order dataset field value from the purchasing user to the selling user storage location in the second data format. Thus, the series of process-representing visual elements shown in FIG. 3 in a third embodiment may represent a third set of end to end common partner business integration process code instructions for transferring and renaming a purchase order dataset field value (e.g., product name, product identification, product price) stored at the purchasing enterprise user storage location (e.g., 210 of FIG. 2) under the first dataset field name in the first data format to the selling enterprise user storage location (e.g., 210 of FIG. 2) identified by the selling enterprise user dataset field name in the selling enterprise user data format. In such a third embodiment, the start element 302 may include the same purchasing user-specified information given in the start element 302 described above with respect to the first embodiment, identifying one or more purchasing order dataset field values according to a purchasing order dataset field name given in a first data format defined by the purchasing user (e.g., 214). The connector element 308 in such a third embodiment may include the same selling user-specified information given in the start element 302 described above with respect to the second embodiment, identifying a purchasing order dataset field name given in the second data format defined by the selling user (e.g., 210) under which the purchasing user's purchase order dataset field value may be stored at the selling user.

In yet another embodiment, the series of process-representing visual elements shown in FIG. 3 may represent a modifiable framework portion of the third set of end to end common partner business data integration process code instructions for transferring and renaming a purchase order dataset field value (e.g., product name, product identification, product price) stored at the purchasing enterprise user storage location (e.g., 210 of FIG. 2) under the first dataset field name in the first data format to the selling enterprise user storage location (e.g., 210 of FIG. 2) identified by the selling enterprise user dataset field name in the selling enterprise user data format. In such an embodiment, connector element 308 may be automatically generated by the integration connectivity sales facilitation system to include the same selling user-specified information given in the start element 302 described above with respect to the second embodiment, identifying a purchasing order dataset field name given in the second data format defined by the selling user (e.g., 210) under which the purchasing user's purchase order dataset field value may be stored at the selling user. Also in such an embodiment, the start element 302 in the framework flow diagram may be modifiable by the purchasing user to include information identifying one or more purchasing order dataset field values according to a purchasing order dataset field name given in a first data format defined by the purchasing user (e.g., 214).

In such a way, the integration connectivity sales facilitation system in an embodiment may provide an integration flow diagram of connector element icons in a visual integration modeling system as a framework for a purchase order integration process associated with business data purchase order data integration process code instructions. The purchasing user can easily finalize the information for the start element 302 in such an embodiment via the visual modeling integration process modeling GUI 300. This modeled integration process flow diagram 300 may then be used to generate business data integration process code instructions for a purchase order between the purchasing user (e.g., 214) and the selling user (e.g., 210).

For example, the integration connectivity sales facilitation system in an embodiment may automatically generate a connector code set of purchase order data integration process code instructions between "Toys Corp." and "Kids Electronics, Inc." for transferring and renaming one or more purchase order dataset field values (e.g., product identification numbers) from "Toys Corp." storage location to the "Kids Electronics, Inc." storage location in the second data format required by "Kids Electronics, Inc."

The integration connectivity sales facilitation system in an embodiment may refer to the connector code sets generated at blocks 802 and 806 to automatically generate the connector code sets for a direct data transfer between "Toys Corp." and "Kids Electronics, Inc." For example, the integration connectivity sales facilitation system in an embodiment may refer to the start code set generated at block 802 for retrieving the purchase order dataset field value matching the entered purchase order dataset field name (e.g., "SKU") from storage maintained by "Toys Corp." As described herein, each set of connector code instructions in an embodiment may include code instructions executable to perform an action on a purchase order dataset field value (e.g., the dataset field value associated with the user-specified purchase order set field name). These code sets may be written or generated in any programming code language. This start code set may have been generated based on a visual model made by "Toys Corp." within a first set of common trading partner integration process code instructions for the transfer of a product description having a purchase order dataset field name "ProductDescription" for storage and processing by Amazon® under a dataset field name "Prod_Desc," for example. As another example, this start code set may have been generated based on a visual model made by "Toys Corp." within a first set of common trading partner integration process code instructions for the transfer of a product identification having a purchase order dataset field name "SKU" for storage and processing by Amazon® under a dataset field name "ProductID." In still another example, this start code set may have been generated based on a visual model made by "Toys Corp." within a first set of common trading partner integration process code instructions for the transfer of a product price having a purchase order dataset field name "UnitPrice" for storage and processing by Amazon® under a dataset field name "unit_price."

The integration connectivity sales facilitation system in an embodiment may refer to the connector code set generated at block 806 for storing the retrieved purchase order dataset field value matching the entered purchase order dataset field name (e.g., "SKU") at storage maintained by "Kids Electronics, Inc." This connector code set may have been generated based on a visual model made by "Kids Electronics, Inc." within a second set of common trading partner integration process code instructions for the transfer of a product description having a purchase order dataset field name "Product_Description" for storage and processing by Amazon® under a dataset field name "Prod_Desc." for example. As another example, this connector code set may have been generated based on a visual model made by "Kids Electronics, Inc." within the second set of common trading partner integration process code instructions for the transfer of a product identification having a purchase order dataset field name "Prod_ID" for storage and processing by Amazon® under a dataset field name "ProductID." In still another example, this connector code set may have been generated based on a visual model made by "Kids Electronics, Inc." within the second set of common trading partner integration process code instructions for the transfer of a product price having a purchase order dataset field name "PricePerUnit" for storage and processing by Amazon® under a dataset field name "unit_price."

The integration connectivity sales facilitation system in one embodiment may transmit the connector code sets for the purchase order data integration process for transferring and renaming the purchase order dataset field value to the selling user storage location in the second data format to the purchasing user system/network for remote execution at block 816. For example, in an embodiment described with reference to FIG. 2, the integration connectivity sales facilitation system operating at the service provider system/server 212 in an embodiment may automatically generate code instructions for an integration process for transmitting any purchasing order dataset field values required for the purchase of products among the previously unconnected integration process users (e.g., 214 and 210). In an embodiment, the integration connectivity sales facilitation system operating at the service provider system/server 212 may automatically generate connector code instructions of a purchase order data integration process for transferring and renaming any dataset field values required for such a purchase order to a storage location managed by the selling user 210 in whatever format is required by the selling user 210, as described above with respect to block 814. The integration connectivity sales facilitation system operating at the service provider system/server 212 may further transmit these connector code instructions, along with a runtime engine for remote execution of those connector code instructions at the purchasing user's enterprise 214. In such a way, the integration connectivity sales facilitation system in an embodiment may allow participating integration process users to search inventory of other participating integration process users for particular products offered for sale, and to automatically generate code instructions for an integration process for transmitting any purchasing order dataset field values required for the purchase of those products among the previously unconnected integration process users.

The blocks of the flow diagrams 7-8 discussed above need not be performed in any given or specified order and may be executed as code instructions at one or a plurality of processors during preparation and set up of visually modeled integration process code instructions or of deployed integration process code instructions as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an integration connectivity sales facilitation system comprising:

a display device displaying a sales connectivity graphical user interface (GUI) indicating a product for sale by a selling user, the GUI receiving a request from a purchasing user via an input device to facilitate transmission of a purchase order dataset field value from the purchasing user to the selling user for purchase of the product;

the display device displaying a data lineage map QUI to receive a purchasing user data lineage map linking the purchase order dataset field value identified by a purchase order dataset field name at a purchasing user storage location in a first data format with a common partner dataset field name in a common partner data format; and a processor executing code instructions of the integration connectivity sales facilitation system to generate a merged data lineage map linking the purchase order dataset field value within a purchasing user data lineage map with a second dataset field value;

the processor executing code instructions of the integration connectivity sales facilitation system to link the purchase order dataset field value identified by the purchase order dataset field name at a-the purchasing user storage location in the first data format with the second dataset field value identified by a second dataset field name at a selling user storage location in a second data format based on first common partner integration process code instructions for transferring and renaming the purchase order dataset field value to a common trading partner storage location identified by the common trading partner dataset field name in the common trading partner data format and based on second common partner integration process code instructions for transferring and renaming the second dataset field value to the common trading partner storage location in the common trading partner data format from the merged data lineage map;

the processor to automatically generate connector code instructions of a purchase order data integration process for transferring and renaming the purchase order dataset field value to the selling user storage location in the second data format; and a network interface device transmitting the connector code instructions of the purchase order data integration process for future execution and a runtime engine for execution at a remote location in deployment of the purchase order data integration process.

2. The information handling system of claim 1, wherein the purchase order dataset field value includes an identification of the product offered for sale.

3. The information handling system of claim 1, wherein the purchase order dataset field value includes an identification of a number of units of the product to purchase.

4. The information handling system of claim 1, wherein the first common partner integration process code instructions are visually modeled via a series of process-representing visual elements to form an end to end business integration process and deployed as an executable business integration.

5. The information handling system of claim 1, wherein the second common partner integration process code instructions are visually modeled via a series of process-representing visual elements to form an end to end business integration process and deployed as an executable business integration.

6. The information handling system of claim 1 further comprising:

a data lineage map GUI to receive a selling user data lineage map linking the second dataset field value identified by the second dataset field name at the selling user storage location in the second data format with the common partner dataset field name in the common partner data format; and the processor executing code instructions of the integration connectivity sales facilitation system to generate the merged data lineage map linking the purchase order dataset field value with the second dataset field value within the selling user data lineage map.

7. The information handling system of claim 1, wherein the purchase order dataset field value includes an identification of the purchasing user.

8. A method of executing code instructions for an integration connectivity sales facilitation system comprising:

displaying a sales connectivity graphical user interface (GUI), via a display device, indicating a product for sale by a selling user, the GUI receiving a request from a purchasing user via an input device to facilitate transmission of a purchase order dataset field value from the purchasing user to the selling user for purchase of the product;

receiving a purchasing user data lineage map linking the purchase order dataset field value identified by a purchase order dataset field name at a purchasing user storage location in a first data format with a common partner dataset field name in a common partner data format;

generate, via a processor executing code instructions of the integration connectivity sales facilitation system, a merged data lineage map linking the purchase order dataset field value within a purchasing user data lineage map with a second dataset field value;

linking the purchase order dataset field value identified by the purchase order dataset field name at the purchasing user storage location in the first data format with the second dataset field value identified by a second dataset field name at a selling user storage location in a second data format based on first common partner integration process code instructions for transferring and renaming the purchase order dataset field value to a common trading partner storage location identified by the common trading partner dataset field name in the common trading partner data format and based on second common partner integration process code instructions for transferring and renaming the second dataset field value to the common trading partner storage location in the common trading partner data format from the merged data lineage map;

automatically generating connector code instructions of a purchase order data integration process for transferring and renaming the purchase order dataset field value to the selling user storage location in the second data format; and transmitting the connector code instructions of the purchase order data integration process for future execution and a runtime engine for execution at a remote location in deployment of the purchase order data integration process.

9. The method of claim 8, wherein the purchase order dataset field value includes an identification of the product offered for sale.

10. The method of claim 8, wherein the purchase order dataset field value includes an identification of a number of units of the product to purchase.

11. The method of claim 8, wherein the purchase order dataset field value includes an identification of the purchasing user.

12. The method of claim 8, wherein the first common partner integration process code instructions are visually modeled via a series of process-representing visual elements to form an end to end business integration process and deployed as an executable business integration.

13. The method of claim 8, wherein the second common partner integration process code instructions are visually modeled via a series of process-representing visual elements to form an end to end business integration process and deployed as an executable business integration.

14. The method of claim 8 further comprising:

receiving a selling user data lineage map linking the second dataset field value identified by the second dataset field name at the selling user storage location in the second data format with the common partner dataset field name in the common partner data format; and generating the merged data lineage map linking the purchase order dataset field value with the second dataset field value within the selling user data lineage map.

15. An information handling system operating an integration connectivity sales facilitation system comprising:

a display device displaying a sales connectivity graphical user interface (GUI) indicating a product for sale by a selling user, the GUI receiving a request from a purchasing user via an input device to facilitate transmission of a purchase order dataset field value from the purchasing user to the selling user for purchase of the product;

the display device displaying a data lineage map GUI to receive a selling user data lineage map linking a second dataset field value identified by a second dataset field name at a selling user storage location in a second data format with a common partner dataset field name in a common partner data format;

a processor executing code instructions of the integration connectivity sales facilitation system to generate a merged data lineage map linking the purchase order dataset field value with a second dataset field value within a selling user data lineage map;

the processor executing code instructions of the integration connectivity sales facilitation system to link the purchase order dataset field value identified by a first purchase order dataset field name at a purchasing user storage location in a first data format with the second dataset field value identified by the second dataset field name at the selling user storage location in the second data format based on first common partner integration process code instructions for transferring and renaming the purchase order dataset field value to a common trading partner storage location identified by the common trading partner dataset field name in the common trading partner data format and based on second common partner integration process code instructions for transferring and renaming the second dataset field value to the common trading partner storage location in the common trading partner data format from the merged data lineage map;

the processor to automatically generate connector code instructions of a purchase order data integration process for transferring and renaming the purchase order dataset field value to the selling user storage location in the second data format; and a network interface device transmitting the connector code instructions of the purchase order data integration process for future execution and a runtime engine for execution at a remote location in deployment of the purchase order data integration process.

16. The information handling system of claim 15, wherein the purchase order dataset field value includes an identification of the product offered for sale.

17. The information handling system of claim 15, wherein the purchase order dataset field value includes an identification of a number of units of the product to purchase.

18. The information handling system of claim 15, wherein the first common partner integration process code instructions are visually modeled via a series of process-representing visual elements to form an end to end business integration process and deployed as an executable business integration.

19. The information handling system of claim 15, wherein the second common partner integration process code instructions are visually modeled via a series of process-representing visual elements to form an end to end business integration process and deployed as an executable business integration.

20. The information handling system of claim 15 further comprising:

a data lineage map GUI to receive a purchasing user data lineage map linking the purchase order dataset field value identified by the purchase order dataset field name at the purchasing user storage location in a first data format with the common partner dataset field name in the common partner data format; and the processor executing code instructions of the integration connectivity sales facilitation system to generate the merged data lineage map linking the purchase order dataset field value within the purchasing user data lineage map with the second dataset field value.

\*    \*    \*    \*    \*